US009948057B2

(12) United States Patent
Takasaka

(10) Patent No.: US 9,948,057 B2
(45) Date of Patent: Apr. 17, 2018

(54) OPTICAL AMPLIFIER, OPTICAL AMPLIFYING SYSTEM, WAVELENGTH CONVERTER, AND OPTICAL COMMUNICATION SYSTEM

(71) Applicant: FURUKAWA ELECTRIC CO., LTD., Tokyo (JP)

(72) Inventor: Shigehiro Takasaka, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/052,315

(22) Filed: Feb. 24, 2016

(65) Prior Publication Data

US 2016/0172818 A1 Jun. 16, 2016

Related U.S. Application Data

(63) Continuation of application No. PCT/JP2014/073006, filed on Sep. 2, 2014.

(30) Foreign Application Priority Data

Sep. 2, 2013 (JP) ................................ 2013-181638

(51) Int. Cl.
*G02B 6/26* (2006.01)
*H01S 3/108* (2006.01)
(Continued)

(52) U.S. Cl.
CPC .......... *H01S 3/1083* (2013.01); *G02B 6/0283* (2013.01); *G02B 6/0365* (2013.01);
(Continued)

(58) Field of Classification Search
CPC .. G02B 6/12007; G02B 6/29395; G02B 6/26; G02B 6/29394; H01S 3/06754
See application file for complete search history.

(56) References Cited

U.S. PATENT DOCUMENTS 7,483,614 B2 * 1/2009 Hirano .............. G02B 6/02028 359/337
7,925,132 B2 * 4/2011 Taniguchi .......... G02B 6/02028 359/341.1
(Continued)

FOREIGN PATENT DOCUMENTS

EP 1 762 868 A1 3/2007
EP 1 988 411 A1 11/2008
(Continued)

OTHER PUBLICATIONS

Extended European Search Report dated Apr. 6, 2017 in Patent Application No. 14839281.4.
(Continued)

*Primary Examiner* — Jennifer Doan
(74) *Attorney, Agent, or Firm* — Oblon, McClelland, Maier & Neustadt, L.L.P.

(57) ABSTRACT

An optical amplifier includes: an optical amplifying fiber; and a pump light source that supplies pump light to the optical amplifying fiber, the pump light being used for parametrically amplifying signal light input to the optical amplifying fiber by using a non-linear optical effect of the optical amplifying fiber. The fluctuation of the zero-dispersion wavelength of the optical amplifying fiber in the longitudinal direction is within the limit of 0.5 nm/100 m.

15 Claims, 17 Drawing Sheets

(51) Int. Cl.

| | |
|---|---|
| ***G02B 6/028*** | (2006.01) |
| ***G02B 6/036*** | (2006.01) |
| ***H04B 10/294*** | (2013.01) |
| ***H04J 14/02*** | (2006.01) |
| ***G02B 6/27*** | (2006.01) |
| ***H01S 3/094*** | (2006.01) |
| ***H01S 3/10*** | (2006.01) |
| ***H01S 3/102*** | (2006.01) |
| *G02B 6/02* | (2006.01) |
| *H01S 3/067* | (2006.01) |
| *H01S 3/23* | (2006.01) |

(52) U.S. Cl.

CPC ........ *G02B 6/2773* (2013.01); *H01S 3/06725* (2013.01); *H01S 3/06729* (2013.01); *H01S 3/094042* (2013.01); *H01S 3/1003* (2013.01); *H01S 3/1028* (2013.01); *H04B 10/294* (2013.01); *H04J 14/0221* (2013.01); *G02B 6/02247* (2013.01); *H01S 3/06754* (2013.01); *H01S 3/2375* (2013.01); *H01S 2301/02* (2013.01); *H01S 2301/04* (2013.01)

(56) References Cited

U.S. PATENT DOCUMENTS

| | | | |
|---|---|---|---|
| 2007/0053641 | A1 | 3/2007 | Hirano et al. |
| 2008/0317418 | A1 | 12/2008 | Taniguchi et al. |
| 2009/0257724 | A1 | 10/2009 | Taniguchi et al. |
| 2014/0043674 | A1 | 2/2014 | Takasaka et al. |

FOREIGN PATENT DOCUMENTS

| | | | |
|---|---|---|---|
| JP | 2007-72182 | A | 3/2007 |
| JP | 2007-225734 | A | 9/2007 |
| JP | 2010-272636 | A | 12/2010 |
| WO | WO 2012/121223 | A1 | 9/2012 |
| WO | WO 2013/153687 | A1 | 10/2013 |

OTHER PUBLICATIONS

International Search Report dated Dec. 2, 2014 in PCT/JP2014/073006.

Japanese Office Action dated Sep. 29, 2015 in Patent Application No. 2015-531184 (with English language translation).

Shigehiro Takasaka, et al., "FOPA with Flat 21-dB Gain and NF Less than 4-dB Using Alternately Concatenated Pump-Phase Shifters and HNLFs" Optical Fiber Communication Conference and Exposition and the National Fiber Optic Engineers Conference (OFC/NFOEC) Technical Digest, Mar. 17, 2013, JTh2A.13 pp. 1-3.

Masashi Onishi, et al., "Recent Technologies on Optical Nonlinearity of Optical Fibers" IEICE Society Conference in 2007, Aug. 29, 2007, pp. S-13 to S-14 with English translation.

J.M. Chavez Boggio, et al., "A Novel Method for Measuring Longitudinal Variations of the Zero Dispersion Wavelength in Optical Fibers" European Conference on Optical Communications (ECOC), Sep. 24, 2006, pp. 1-2.

Shigehiro Takasaka, et al., "Flat and Broad Amplification by Quasi-Phase-Matched Fiber Optical Parametric Amplifier" Optical Fiber Communication Conference and Exposition (OFC/NFOEC), 2012 and the National Fiber Optic Engineers Conference Technical Digest, Mar. 4, 2012, OThC1.4, pp. 1-3.

Robert Elschner, et al., "Characterization of FWM-Induced Crosstalk for WDM Operation of a Fiber-Optical Parametric Amplifier" ECOC Technical Digest, 2011, Mo.1.A2, pp. 1-3.

L.F. Mollenauer, et al., "Method for Facile and Accurate Measurement of Optical Fiber Dispersion Maps" Optics Letters, vol. 21, No. 21, Nov. 1, 1996, pp. 1724-1726.

* cited by examiner 100A
300
OSA
200
ATT
10
11
12
13
30A
24
BPF
23
20
22
Phase modulator
26
25
21
41
42

1000
1010
1011
1012
1013
1014
1015
30
300
OSA
200
ATT
24
BPF
23
20
22
Phase modulator
25
21
41
42

OPTICAL AMPLIFIER, OPTICAL AMPLIFYING SYSTEM, WAVELENGTH CONVERTER, AND OPTICAL COMMUNICATION SYSTEM

CROSS-REFERENCE TO RELATED APPLICATION

This application is a continuation of PCT International Application No. PCT/JP2014/073006 filed on Sep. 2, 2014 which claims the benefit of priority from Japanese Patent Application No. 2013-181638 filed on Sep. 2, 2013, the entire contents of which are incorporated herein by reference.

BACKGROUND OF THE INVENTION

1. Field of the Invention

The present invention relates to an optical amplifier, an optical amplifying system, a wavelength converter, and an optical communication system.

2. Description of the Related Art

Optical amplifiers have become indispensable for optical communications. In today's optical communication systems, Erbium-Doped Fiber Amplifiers (EDFAs), Raman amplifiers, and Raman amplifying systems are in practical use as optical amplifiers and optical amplifying systems for optical communication bands.

When an optical communication system is constructed by using an optical amplifier, it is desirable if the optical amplifier has excellent noise characteristics (less noise), because the less noise there is, the longer the transmission distance becomes. However, as for EDFAs, because the technology for reducing noise has matured, it is difficult to further reduce noise from the current level. In contrast, using Raman amplifiers and Raman amplifying systems can contribute to reducing noise in optical communication systems. However, it would be difficult to introduce either a Raman amplifier or a Raman amplifying system to each of all the optical fiber transmission paths that are installed.

Further, an Optical Parametric Amplifier (OPA) such as the one disclosed in International Publication No. WO 2012/121223 that utilizes a non-linear effect occurring inside an optical fiber for realizing an optical amplification is known to be able to reduce the noise than EDFAs. Further, Phase Sensitive Amplifiers (PSAs) are known as optical amplifiers that utilize a non-linear effect occurring inside an optical fiber. However, for the reasons that OPAs have a small amplification bandwidth and that the gain spectrum thereof is not flat, OPAs have not been put into practical use.

To cope with these situations, the inventors of the present invention disclosed an invention of an OPA realizing a gain spectrum that is flat and has a broadband characteristic by performing a quasi-phase-matching process (see International Publication No. WO 2012/121223, International Application No. PCT/JP2012/072255, S. Takasaka et al., "Flat and Broad Amplification by Quasi-Phase-Matched Fiber Optical Parametric Amplifier", OFC/NFOEC 2012, OTh1C.4 (2012), and S. Takasaka et al., "FOPA with Flat 21-dB Gain and NF less than 4-dB using Alternately Concatenated Pump-Phase Shifters and HNLFs", OFC/NFOEC 2013, JTh2A.13 (2013)).

SUMMARY OF THE INVENTION

It is an object of the present invention to at least partially solve the problems in the conventional technology.

In accordance with one aspect of the present invention, an optical amplifier includes: an optical amplifying fiber; and a pump light source that supplies pump light to the optical amplifying fiber, the pump light being used for parametrically amplifying signal light input to the optical amplifying fiber by using a non-linear optical effect of the optical amplifying fiber. A fluctuation of a zero-dispersion wavelength of the optical amplifying fiber in a longitudinal direction is within a limit of 0.5 nm/100 m.

In accordance with another aspect of the present invention, an optical amplifier includes: an optical amplifying fiber; and a pump light source that supplies pump light to the optical amplifying fiber, the pump light being used for parametrically amplifying wavelength-multiplexed signal light input to the optical amplifying fiber by using a non-linear optical effect of the optical amplifying fiber. A power difference between a power of the pump light and a total power of the wavelength-multiplexed signal light that are input to the optical amplifier is 24 dB or larger.

In accordance with still another aspect of the present invention, an optical amplifying system includes: the optical amplifier according to the aspect of the present invention.

In accordance with still another aspect of the present invention, a wavelength converter includes: the optical amplifier according to the aspect of the present invention.

In accordance with still another aspect of the present invention, an optical communication system includes: the optical amplifier according to the aspect of the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
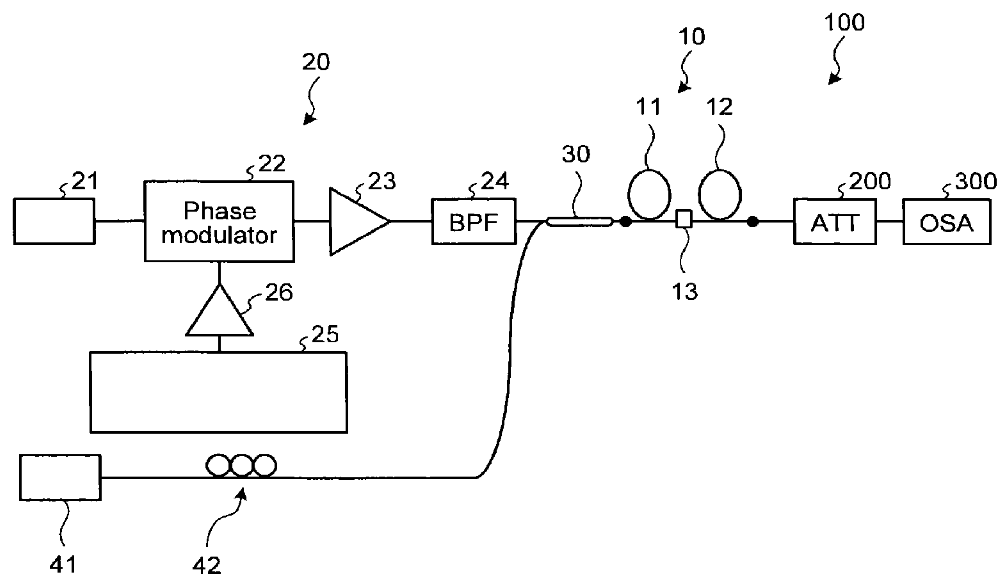
FIG. 1 is a schematic diagram illustrating an optical amplifier according to a first embodiment and an amplification characteristic measuring system thereof.

Exemplary embodiments of an optical amplifier, an optical amplifying system, a wavelength converter, and an optical communication system according to the present invention will be explained in detail below, with reference to the accompanying drawings. The present invention is not limited to these embodiments. Further, some of the constituent elements illustrated in the drawings that are the same as or that correspond to one another are referred to by using the same reference characters, as appropriate. It should be further noted that the drawings are schematically expressed, and the dimensions of the elements, and the proportions among the dimensions may be different in actuality. Further, the dimensional relationships and the proportions among the drawings may be different in some parts of the drawings.

In order to put OPAs into practical use, an OPA capable of achieving a higher gain while realizing a gain spectrum that is flat and has a broadband characteristic is in demand.

As mentioned above, the inventors of the present invention disclosed the OPA realizing the gain spectrum that is flat and has the broadband characteristic by performing the quasi-phase-matching process. The OPA exhibited characteristics where the gain was approximately 10 dB, and the 0.3-dB gain bandwidth was approximately 30 nm.

To realize an OPA having a higher degree of practicality, the inventors of the present invention carried out an experiment to apply a multi-stage configuration to an OPA, in order to realize a 20-dB gain and flatness in the gain within 1 dB, in a C band (e.g., a 35-nm range from 1530 nm to 1565 nm).

However, as noted below, in the experiment for applying the multi-stage configuration to the OPA, it was not possible to achieve a sufficient bandwidth, although the gain increased.

In contrast, according to the embodiments of the present invention described below, it is possible to realize an optical amplifier that is able to achieve a higher gain, while realizing a gain spectrum that is flat and has a broadband characteristic.

The OPA in the present description denotes an optical amplifier configured as follows: Pump light and signal light, which is light to be amplified, are input to an optical amplifying fiber serving as an amplifying medium. In the optical amplifying fiber, idler light is generated from the pump light and the signal light, due to a non-linear optical effect of the optical amplifying fiber. Further, the signal light is parametrically amplified. The relationship between the wavelength λidler [nm] of the idler light and the wavelength λpump [nm] of the pump light and the wavelength λsignal [nm] of the signal light can be expressed as below.

$$1/\lambda idler=2/\lambda pump-1/\lambda signal$$

Further, the PSA in the present description denotes an optical amplifier configured as follows: In the PSA, in addition to pump light and signal light, idler light having a power 0.1 to 10 times as large as that of the signal light is input to an optical amplifying fiber. As the outputs of the optical amplifying fiber, the pump light, parametrically-amplified signal light, and parametrically-amplified idler light are output. The wavelength of the idler light can be expressed as below, in the same manner as with the idler light of the OPA.

$$1/\lambda idler=2/\lambda pump-1/\lambda signal$$

<First Embodiment>

FIG. 1 is a schematic diagram illustrating an optical amplifier 100 according to a first embodiment of the present invention and an amplification characteristic measuring system thereof. As illustrated in FIG. 1, the optical amplifier 100, which is an OPA, includes an optical amplifying member 10, a pump light source unit 20, and an optical multiplexer/demultiplexer 30.

The optical multiplexer/demultiplexer 30 included in the optical amplifier 100 has connected thereto a signal light source 41 configured with a wavelength-tunable laser device and used for measuring processes, via a polarization controller 42. Further, an optical amplifying fiber 12 included in the optical amplifier 100 has connected thereto an optical spectrum analyzer 300 used for measuring a spectrum, a gain, and a Noise Figure (NF), via an optical attenuator 200.

Next, a configuration of the optical amplifier 100 will be explained more specifically, by sequentially describing the pump light source unit 20, the optical amplifying member 10, and the optical multiplexer/demultiplexer 30, in the stated order.

The pump light source unit 20 includes a pump light source 21, a phase modulator 22, an optical fiber amplifier 23, an optical band-pass filter 24, a white noise source 25, and a broadband RF amplifier 26. The pump light source 21, the phase modulator 22, the optical fiber amplifier 23, and the optical band-pass filter 24 are connected together by optical fibers. It is desirable to use a polarization-maintaining optical fiber as the optical fiber used in the connection.

The pump light source 21 outputs pump light that is to be supplied to the optical amplifying member 10 and has a predetermined pump light wavelength. The pump light source 21 is configured by using a wavelength-tunable laser device, but may be configured by using a Distributed Feedback (DFB) laser, a Fabry-Perot (FP) laser, or a Vertical Cavity Surface Emitting Laser (VCSEL). The white noise source 25 outputs a white noise signal in a 1.2-GHz broadband as an electrical signal. In this situation, the white noise source 25 may output a 2-GHz white noise signal or may output a plurality of sine waves having mutually-different frequencies as the white noise signal. The broadband RF amplifier 26 amplifies the white noise signal output by the white noise source 25 and outputs the amplified white noise signal to the phase modulator 22. The phase modulator 22 receives inputs of the pump light and the amplified white noise signal, modulates the phase of the pump light at a predetermined degree of phase modulation while using the amplified white noise signal, and outputs the phase-modulated pump light to the optical fiber amplifier 23. In this situation, because the spectrum width of the pump light becomes larger due to the phase modulation of the pump light, it is possible to inhibit the occurrence of, or suppress the power of, Stimulated Brillouin Scattering (SBS) in the optical amplifying member 10. When the pump light source 21 is configured by using an FP laser or a VCSEL, which has a larger spectrum width, the degree of phase modulation may be lower than when configured by using a DFB laser.

The optical fiber amplifier 23 may be, for example, an EDFA or an Erbium-Ytterbium-Doped Fiber Amplifier (EYDFA). The optical fiber amplifier 23 optically amplifies the pump light of which the phase was modulated by the phase modulator 22 and outputs the optically-amplified pump light to the optical band-pass filter 24. The center wavelength of the transmission of the optical band-pass filter 24 matches the pump light wavelength. The optical band-pass filter 24 eliminates an Amplified Spontaneous Emission (ASE) component that occurred at the optical fiber amplifier 23 from the pump light amplified by the optical fiber amplifier 23 and outputs the result. It is desirable to arrange the transmission wavelength bandwidth of the optical band-pass filter 24 to be small (e.g., 1 nm or shorter).

In this situation, in the pump light source unit 20, an optical isolator may be inserted in an arbitrary position ahead of the pump light source 21.

Next, the optical amplifying member 10 will be explained. The optical amplifying member 10 is a two-stage optical amplifying member that includes optical amplifying fibers 11 and 12 and a relative phase shifter 13 inserted between the optical amplifying fibers 11 and 12.

Figure 2:
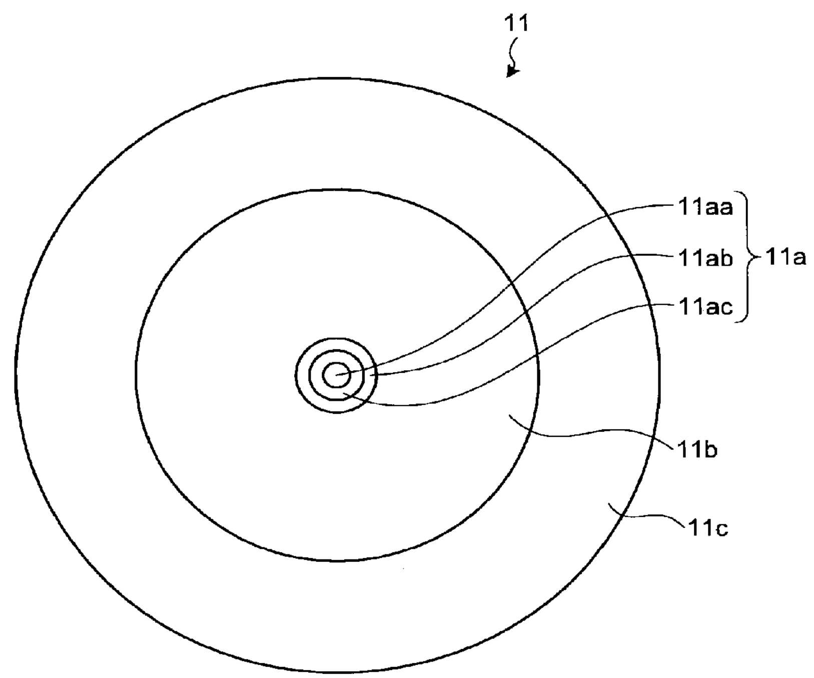
FIG. 2 is a schematic cross-sectional view of one of the optical amplifying fibers illustrated in FIG. 1.
Figure 3:
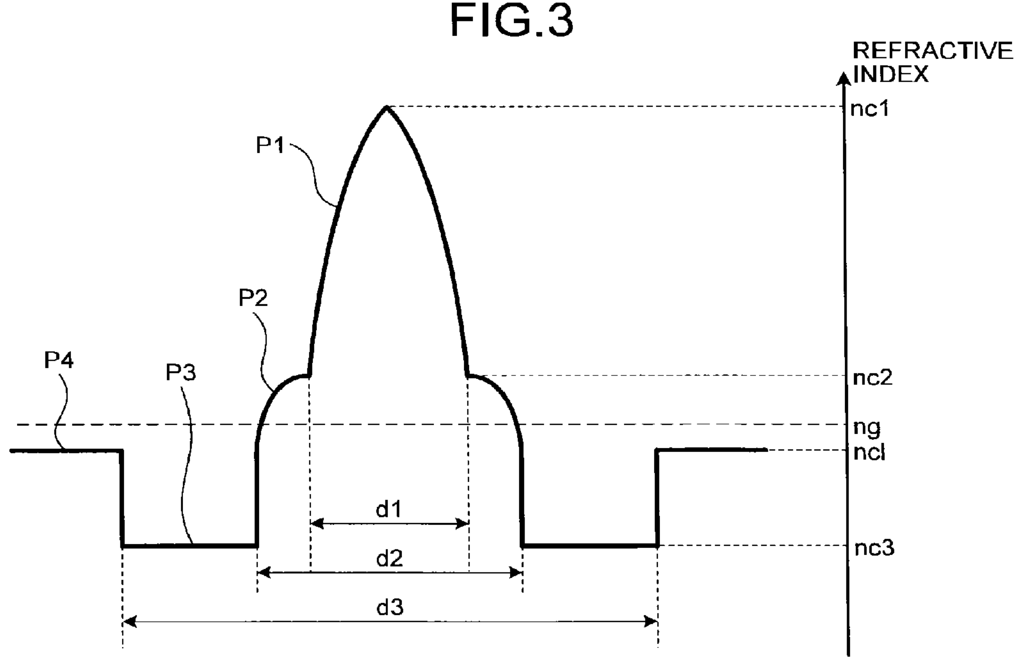
FIG. 3 is a schematic chart illustrating a refractive index profile of one of the optical amplifying fibers illustrated in FIG. 1.

FIG. 2 is a schematic cross-sectional view of the optical amplifying fiber 11 illustrated in FIG. 1. FIG. 3 is a schematic chart illustrating a refractive index profile of the optical amplifying fiber 11 illustrated in FIG. 1. Because the optical amplifying fiber 12 has the same configuration as that of the optical amplifying fiber 11, explanation thereof will be omitted.

The optical amplifying fiber 11 has a core portion 11*a* including: a center core part 11*aa*; an outer core layer 11*ac* which is formed in the surrounding of the center core part 11*aa* and of which the refractive index is lower than that of the center core part 11*aa*; and a buffer core layer 11*ab* which is formed between the center core part 11*aa* and the outer core layer 11*ac* and of which the refractive index is lower than that of the center core part 11*aa* and is higher than that of the outer core layer 11*ac*, and a cladding portion 11*b* which is formed in the surrounding of the outer core layer 11*ac* and of which the refractive index is lower than that of the center core part 11*aa* and is higher than that of the outer core layer 11*ac*. The effective core area at the wavelength 1550 nm is 18 $\mu m^2$ or smaller and may be 10.27 $\mu m^2$ or larger, for example. Further, the optical amplifying fiber 11 includes a coating portion 11*c* that is formed in the surrounding of the cladding portion 11*b* (see Japanese Laid-open Patent Publication No. 2007-225734).

The core portion 11*a* and the cladding portion 11*b* are configured by using $SiO_2$ glass as a base thereof. As for the core portion 11*a*, it is possible to form a refractive index profile having a desired shape, by adjusting the additive amount of a refractive index adjusting dopant such as $GeO_2$ or fluorine (F) that is added for the purpose of adjusting the refractive index and/or adjusting the additive amount distribution thereof in the radial direction. In that situation, it is possible to raise the refractive index by adding $GeO_2$ and to lower the refractive index by adding F. The cladding portion 11*b* may be configured with, for example, pure $SiO_2$ glass, but a refractive index adjusting dopant such as $GeO_2$ or F may be added thereto to achieve a desired refractive index. In this situation, being configured with substantially pure $SiO_2$ glass means that no refractive index adjusting dopant is contained, but Cl elements or the like having no effect on the refractive index may be contained. Further, although the coating portion 11*c* is usually configured with ultraviolet-curable resin having a two-layer structure, there is no particular limitation.

The outside diameter of the cladding portion 11*b* is usually 125 μm, but may be configured so as to be 100 μm or smaller. In that situation, it is possible to reduce the diameter, when the optical amplifying fiber 11 is wound around a bobbin or the like. Further, the outside diameter of the coating portion 11*c* is usually 250 μm, but may be configured so as to be 150 μm or smaller by reducing the outside diameter of the cladding. In that situation, the volume of the optical amplifying fiber 11 becomes smaller. Accordingly, it is possible to realize a compact non-linear optical device by winding the optical amplifying fiber 11 around a bobbin having a small diameter and arranging the bobbin to be housed in a casing.

Further, as illustrated in FIG. 3, in the optical amplifying fiber 11, the center core part 11*aa* has a diameter expressed as d1, has a refractive index profile expressed as P1, and has the maximum refractive index expressed as nc1. The outer core layer 11*ac* has an outside diameter expressed as d3, has a refractive index profile expressed as P3, and has the minimum refractive index expressed as nc3. The buffer core layer 11*ab* has an outside diameter expressed as d2, has a refractive index profile expressed as P2, and has the maximum refractive index expressed as nc2. The cladding portion 11*b* has a refractive index profile expressed as P4 and has a refractive index expressed as nc1. In the present example, "ng" expresses the refractive index of pure $SiO_2$ glass.

Next, a profile parameter that characterizes the refractive index profile of the optical amplifying fiber 11 will be defined. First, the ratio d1/d3, which is the ratio of the diameter d1 of the center core part 11*aa* to the outside diameter d3 of the outer core layer 11*ac*, is defined as Ra11, whereas the ratio d2/d3, which is the ratio of the diameter d2 of the buffer core layer 11*ab* to the outside diameter d3 of the outer core layer 11*ac* is defined as Ra12. Further, the maximum relative refractive-index difference of the center core part 11*aa* to the cladding portion 11*b* is defined as Δ11. The minimum relative refractive-index difference of the outer core layer 11*ac* to the cladding portion 11*b* is defined as Δ12. The maximum relative refractive-index difference of the buffer core layer 11*ab* to the cladding portion 11*b* is defined as Δ14. Further, the relative refractive-index difference of the cladding portion 11*b* to the refractive index of pure $SiO_2$ glass is expressed as Δclad. When the cladding portion is configured with substantially pure $SiO_2$ glass, Δclad is equal to 0%. In the present description, Δ11, Δ12, Δ14, and Δclad are defined by using Expressions (1) to (4) below.

$$\Delta 11=[(nc1-nc1)/nc1]\times 100(\%) \quad (1)$$

$$\Delta 12=[(nc3-nc1)/nc3]\times 100(\%) \quad (2)$$

$$\Delta 14=[(nc2-nc1)/nc2]\times 100(\%) \quad (3)$$

$$\Delta clad=[(nc1-ng)/nc1]\times 100(\%) \quad (4)$$

In the optical amplifying fiber 11, the ratio d3/d1, which is the ratio of the outside diameter of the buffer core layer 11*ab* to the diameter of the center core part 11*aa*, is in the range from 1.2 to 2.0 inclusive. Further, Δ11 is 1.8% or higher, and is preferably 2.2% or higher and 3.0% or lower. Further, the outside diameter of the outer core layer 11*ac* is equal to or larger than 9.4 μm and is equal to or smaller than 21.4 μm. The ratio d1/d3, which is the ratio of the diameter of the center core part 11*aa* to the outside diameter of the outer core layer 11*ac*, is equal to or larger than 0.20 and is equal to or smaller than 0.40. The ratio d2/d3, which is the ratio of the outside diameter of the buffer core layer 11*ab* to the outside diameter of the outer core layer 11*ac*, is equal to or larger than 0.24 and is equal to or smaller than 0.80. Furthermore, Δ12 is in the range from −1.2% to −0.2% inclusive, and is preferably in the range from −1.2% to −0.4% inclusive. Also, Δ14 is in the range from 0.1% to 0.6% inclusive, and is preferably in the range from 0.3% to 0.6% inclusive.

The center core part 11*aa* and the buffer core layer 11*ab* each have a so-called α-type refractive index profile, in which the value of α is α11 and α14, respectively. The value of α is an index indicating the shape of the refractive index profile and is defined by using Expressions (5) and (6) below. The larger the value of α is, the more round the central part of the refractive index profile of the core becomes, which means that the shape changes from a triangle to a rectangle.

$$n^2(r)=nc1^2\{1-2(\Delta 11/100)\cdot(2r/d1)\hat{}\alpha 11\} \quad (5)$$

where 0≤r<d1/2

$$n^2(r)=nc2^2\{1-2(\Delta 14/100)\cdot((r/r14max)/(d2/2-r14max))\hat{}\alpha 14\} \quad (6)$$

where r14max≤r<d2/2

In the expressions above, "r" denotes a position from the center of the optical fiber in the radial direction. Further, "r14max" denotes a position from the center of the optical fiber in the radial direction, with respect to the point at which the relative refractive-index difference to the cladding portion 11*b* is at a maximum in the range satisfying d1/2≤r<d2/2. When r14max does not denote a single point but denotes a wide area, the center point of the area is expressed as r14max. In FIG. 3, r14max=d1/2 is satisfied. Further, n(r) denotes the refractive index in position r.

As for the transmission characteristics of the optical amplifying fiber 11, in order to transmit signal light having a wavelength of 1500 nm or longer in a single mode, the cutoff wavelength is set to 1500 nm or shorter. Further, the fluctuation of the zero-dispersion wavelength in the longitudinal direction is within the limit of 0.5 nm per length of 100 meters (0.5 nm/100 m), and is preferably within the limit of 0.2 nm/100 m. In that situation, at the wavelength 1550 nm, the fluctuation width of the wavelength dispersion in the longitudinal direction is 1 ps/nm/km or smaller per length of one kilometer. Thus, even if the length of the optical fiber is long, the wavelength dispersion characteristics in the longitudinal direction are stable. It is therefore possible to efficiently utilize non-linear optical phenomena. Further, the absolute value of the wavelength dispersion at the wavelength 1550 nm is 5 ps/nm/km or smaller, and is preferably 1 ps/nm/km or smaller. Accordingly, the generation efficiency of non-linear optical phenomena such as Four-Wave Mixing (FWM) is high. Further, in the range where the absolute value of the wavelength dispersion at the wavelength 1550 nm is 5 ps/nm/km or smaller, the fluctuation of the wavelength dispersion at the wavelength 1550 nm caused by a 1% change in the outside diameter of the outer core layer 11*ac* (i.e., the outside diameter of the core portion 11*a*) is 0.7 ps/nm/km or smaller. Thus, the optical fiber exhibits the wavelength dispersion having a stably small absolute value in the longitudinal direction. Further, the absolute value of the wavelength dispersion slope at the wavelength 1550 nm is in the range from 0.02 $ps/nm^2/km$ to 0.06 $ps/nm^2/km$ inclusive. Thus, the optical fiber exhibits the wavelength dispersion of which the absolute value is small in a large wavelength bandwidth. Further, at the wavelength 1550 nm, the transmission loss is 1.5 dB/km or smaller. Thus, the optical loss is small, while the generation efficiency of non-linear optical phenomena is high. Further, the polarization mode dispersion at the wavelength 1550 nm is 0.2 $ps/km^{1/2}$ or smaller. Thus, even when the signal light is short-pulse light, it is possible to inhibit deterioration of the pulse waveform that may occur during the propagation through the optical fiber. Further, the non-linear coefficient ($n_2/A_{eff}$) at the wavelength 1550 nm is $40\times 10^{-10}$/W or larger. Thus, the generation efficiency of non-linear optical phenomena is high. In this situation, $n_2$ denotes the non-linear refractive index, whereas $A_{eff}$ denotes the effective core area.

In the present description, the cutoff wavelength (λc) denotes the fiber cutoff wavelength defined by International Telecommunication Union Telecommunication Standardization Sector (ITU-T) G.650.1. The effective core area denotes the effective core area defined by ITU-T G.650.2. The method for measuring the effective core area is the same as the method for measuring a mode field diameter (MFD) defined by ITU-T G.650.1, and the effective core area is calculated from a measured result according to the definition by ITU-T G.650.2. Other technical terms that are not particularly defined in the present description are compliant with the definitions and measuring methods presented in ITU-T G.650.1. Further, the non-linear coefficient ($n_2/A_{eff}$)

used in the present description is a measured value obtained by implementing a Cross-Phase Modulation (XPM) method.

Figure 4:
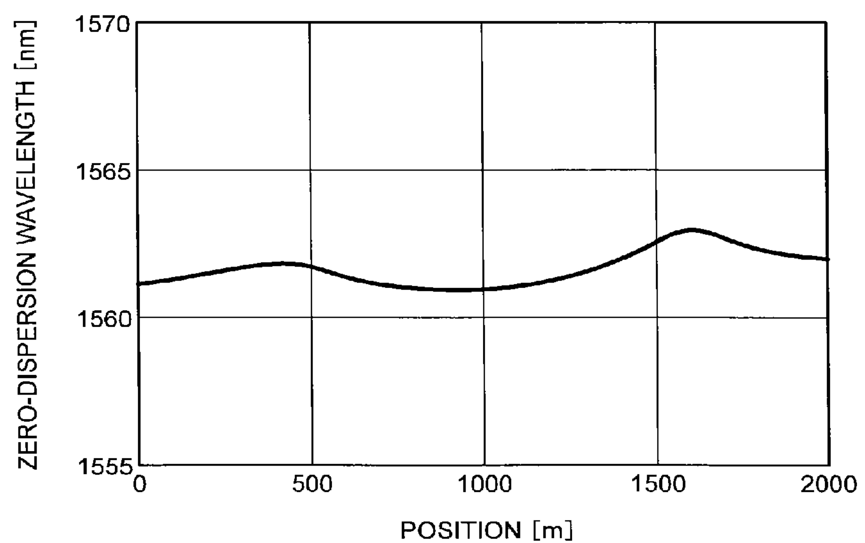
FIG. 4 is a chart illustrating an example of a distribution of a zero-dispersion wavelength in the longitudinal direction of a raw optical fiber used for preparing the optical amplifying fibers illustrated in FIG. 1.

FIG. 4 is a chart illustrating an example of a distribution of the zero-dispersion wavelength in the longitudinal direction of a raw optical fiber used for preparing the optical amplifying fibers 11 and 12 illustrated in FIG. 1. As illustrated in FIG. 4, the raw optical fiber having a length of 2000 m has a part where the fluctuation of the zero-dispersion wavelength in the longitudinal direction is within the limit of 0.5 nm/100 m. It is therefore possible to prepare the optical amplifying fibers 11 and 12 by using the raw optical fiber. In this situation, it is possible to calculate the distribution of the zero-dispersion wavelength in the longitudinal direction of the optical fiber, by measuring the fluctuation of the wavelength dispersion in the longitudinal direction of the optical fiber by implementing a non-linear Optical Time Domain Reflectometer (OTDR) method disclosed in Optics Letters, vol. 21, pp. 1724-1726 (1996).

The relative phase shifter 13 is configured by using, for example, a Fiber Bragg Grating (FBG). The Bragg wavelength thereof is set in the vicinity of the zero-dispersion wavelength of the optical amplifying fibers 11 and 12.

The optical multiplexer/demultiplexer 30 connects the pump light source unit 20, the optical amplifying member 10, and the signal light source 41 to one another. The optical multiplexer/demultiplexer 30 has a function of multiplexing the pump light and the signal light together. For example, although the optical multiplexer/demultiplexer 30 may be a 20-dB optical coupler or an optical band-pass filter, there is no particular limitation. When the optical multiplexer/demultiplexer 30 is a 20-dB optical coupler, the pump light source unit 20 and the optical amplifying member 10 are connected together to realize a small optical loss, while the optical amplifying member 10 and the signal light source 41 are connected together to realize an optical loss of approximately 20 dB.

Next, an operation of the optical amplifier 100 will be explained. The pump light source unit 20 outputs the pump light of which the phase was modulated, which was optically amplified, and from which the ASE component was eliminated (hereinafter, simply "pump light"). In this situation, the wavelength of the pump light is set in the vicinity of the zero-dispersion wavelength of the optical amplifying fibers 11 and 12. In contrast, the signal light source 41 outputs the signal light. The wavelength of the signal light is set to a wavelength within the amplification bandwidth of the optical amplifier 100. The optical multiplexer/demultiplexer 30 multiplexes the pump light and the signal light together and inputs the multiplexed result to the optical amplifying member 10 through the optical amplifying fiber 11.

By using the non-linear optical effect of the optical amplifying fibers 11 and 12 to which the pump light was input, the optical amplifying member 10 parametrically amplifies the signal light and outputs the result from the optical amplifying fiber 12 side.

In this situation, the relative phase shifter 13 shifts a relative phase $\phi$rel of the light propagated through the optical amplifying fiber 11 by an appropriate amount, in accordance with the power of the input pump light, the lengths, the non-linear coefficients, and the dispersion characteristics of the optical amplifying fibers 11 and 12, and the like. The lengths and the dispersions of the optical amplifying fibers 11 and 12 are appropriately set in accordance with a desired gain spectrum waveform.

For example, as indicated in International Application No. PCT/JP2012/072255 and the like, the relative phase shifter 13 has configured therein a value of $\gamma PL$, which is the product of a non-linear constant $\gamma$ of the optical amplifying fiber 11, the length L thereof, and an input power P of the pump light, in such a manner that the relative phase $\phi$rel of the light output from the optical amplifying fiber 11 which is the amplifying stage connected on the preceding stage side of the relative phase shifter 13 is larger than $0.5\pi$. The relative phase shifter 13 changes the relative phase $\phi$rel to a value smaller than $0.5\pi$ and outputs the result to the optical amplifying fiber 12 at the following stage.

By installing the relative phase shifter 13, it is possible to achieve flatness in the gain spectrum, which would not be achievable if no relative phase shifter was inserted between the optical amplifying fibers 11 and 12. At the same time, it is possible to achieve a Noise Figure (NF) that is smaller than when no relative phase shifter is provided.

In this situation, the relative phase $\phi$rel is an amount that can be expressed with the expression below, by using the phase $\phi$signal [radian] of the signal light, the phase $\phi$idler [radian] of the idler light, and the phase $\phi$pump [radian] of the pump light.

$$\phi\text{rel}=\Delta k+\phi\text{signal}+\phi\text{idler}-2\phi\text{pump}[\text{radian}]$$

where $\Delta$k is defined as $\Delta k$=ksignal+kidler−2kpump, while ksignal, kidler, and kpump each denote the wave number of the light.

As described above, the relative phase $\phi$rel is the amount defined by the phases of the plurality of types of light. Accordingly, as the relative phase shifter, for example, it is acceptable to use any of the following: a phase shifter that shifts only the phase of the pump light; a phase shifter that shifts only the phase of the signal light; a phase shifter that shifts only the phase of the idler light; and a phase shifter that shifts two or more selected from among the phase of the pump light, the phase of the signal light, and the phase of the idler light. The relative phase shifter 13 according to the first embodiment is a phase shifter that shifts only the phase of the pump light.

In particular, the optical amplifier 100 is able to realize an amplification characteristic where a higher gain is achieved, while realizing a gain spectrum that is flat and has a broadband characteristic, by using the dispersion-stable optical fibers as the optical amplifying fibers 11 and 12, of which the fluctuation of the zero-dispersion wavelength in the longitudinal direction is within the limit of 0.5 nm/100 m, or is preferably within the limit of 0.2 nm/100 m.

Figure 5:
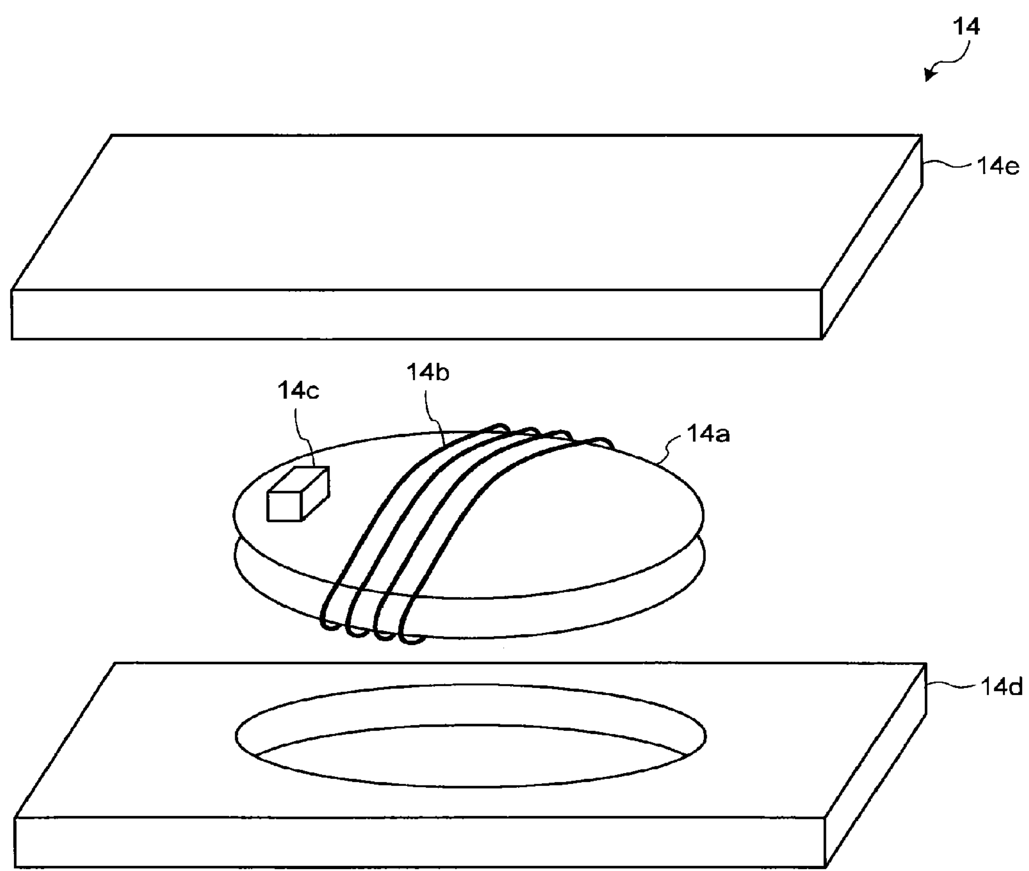
FIG. 5 is a schematic diagram of a temperature adjusting mechanism applicable to the optical amplifying fibers illustrated in FIG. 1.

In this situation, the optical amplifying fibers 11 and 12 included in the optical amplifier 100 may be provided with a temperature adjusting mechanism described below. FIG. 5 is a schematic diagram of a temperature adjusting mechanism applicable to the optical amplifying fibers 11 and 12 illustrated in FIG. 1. A temperature adjusting mechanism 14 includes: a bobbin 14*a* which is configured with a material having high thermal conductivity such as aluminum, for example, and around which the optical amplifying fiber 11 or 12 is wound; a heater wire 14*b* wound around the bobbin 14*a*; a temperature detecting element 14*c* that is configured with a thermistor, a thermocouple, or the like and is attached to the bobbin 14*a*; and casings 14*d* and 14*e* that are each made of a thermally-insulative material and have a recess in which the bobbin 14*a* is housed.

When the temperature adjusting mechanism 14 is used, the bobbin 14*a* is housed in the casings 14*d* and 14*e*, while the optical amplifying fiber 11 or 12 is wound around the bobbin 14*a*, and further, the heater wire 14*b* is also wound around the bobbin 14*a*. Further, an electric current from a power source (not illustrated) is caused to flow in the heater wire 14*b* so that heat is generated thereby, so as to heat the optical amplifying fiber 11 or 12 to a predetermined set temperature. In this situation, the temperature of the optical amplifying fiber 11 or 12 is being measured by the temperature detecting element 14*c*. It is desirable to adjust the temperature of the optical amplifying fiber 11 or 12 to be in the range of "the predetermined set temperature±2° C.", by adjusting the electric current flowing in the heater wire 14*b* on the basis of the measured temperature.

The zero-dispersion wavelength of the optical amplifying fiber 11 or 12 shifts toward the longer wavelength side, when the temperature thereof is raised. Accordingly, by adjusting the temperature of the optical amplifying fiber 11 or 12, it is possible to adjust the zero-dispersion wavelength thereof. Thus, for example, when the user wishes to use a desired pump light wavelength, it is possible to adjust the zero-dispersion wavelength of the optical amplifying fiber 11 or 12 so as to be close to, or preferably so as to match, an optimal value (e.g., a value that arranges the gain bandwidth of the optical amplifier 100 to be at a maximum) with respect to the desired pump light wavelength, by using an optical amplifying fiber of which the zero-dispersion wavelength at the ambient temperature (e.g., a room temperature of 25° C.±5° C.) is on the shorter wavelength side of the desired pump light wavelength within the limit of 5 nm (e.g., on the shorter wavelength side by approximately 1 nm to 2 nm) as the optical amplifying fiber 11 or 12, and by heating the optical amplifying fiber 11 or 12 with the temperature adjusting mechanism 14 so as to precisely shift the zero-dispersion wavelength toward the longer wavelength side. It is acceptable to adjust the zero-dispersion wavelength by adjusting the temperature in this manner, for only one of the optical amplifying fibers 11 and 12; however, it is preferable to make the adjustment on both of the optical amplifying fibers 11 and 12. When the adjustment is made on both of the optical amplifying fibers 11 and 12, it is even more preferable to make an optimal adjustment for each of the optical amplifying fibers 11 and 12, so as to shift the zero-dispersion wavelength to a desired optimal level, in accordance with the respective zero-dispersion wavelength thereof corresponding to the ambient temperature.

When the relative phase shifter 13 is a relative phase shifter configured to primarily shift the phase of the pump light, in order to realize the characteristic where the gain spectrum of the optical amplifier 100 is flat and has a broadband characteristic, it is desirable that the zero-dispersion wavelength of the optical amplifying fibers 11 and 12, the wavelength of the pump light, and the wavelength (e.g., the wavelength at which the wavelength changing ratio of the phase shift becomes the largest) of the relative phase shifter 13 that shifts the phase of the pump light match one another within the range of approximately ±1 nm.

More specifically, it is possible to adjust the zero-dispersion wavelength of the optical amplifying fibers 11 and 12, by adjusting the temperature thereof and/or adjusting the tension thereof. When the pump light source 21 is configured by using a semiconductor laser device such as a DFB laser, an FP laser, a VCSEL, or the like, it is possible to adjust the emission wavelength of the semiconductor laser device by adjusting the temperature thereof and/or adjusting the driving current therefor. Further, when the relative phase shifter 13 is an FBG, it is possible to adjust the Bragg wavelength of the FBG, by adjusting the temperature thereof and/or adjusting the tension thereof. It is possible to realize a gain spectrum of the optical amplifier 100 that is flat and has a broadband characteristic, by making adjustments while arbitrarily combining one, two, or three selected from among the three characteristic wavelengths (i.e., the zero-dispersion wavelength, the oscillation wavelength, and the Bragg wavelength). Accordingly, it is desirable to configure the optical amplifier 100 so as to include a tension adjusting mechanism that adjusts the tension applied to the optical amplifying fibers 11 and 12; a temperature adjusting mechanism that adjusts the temperature of the semiconductor laser device or a driving current adjusting mechanism that adjusts the driving current for the semiconductor laser device; or a temperature adjusting mechanism that adjusts the temperature of the FBG or a tension adjusting mechanism that adjusts the tension applied to the FBG.

For example, when an athermal FBG in which dependency of the reflection wavelength on temperature is cancelled is used as the FBG included in the relative phase shifter 13, it is possible to make an adjustment so as to arrange the zero-dispersion wavelength of the optical amplifying fibers 11 and 12 and the oscillation wavelength of the semiconductor laser device to match the Bragg wavelength of the FBG, by using the mechanisms described above. Further, when the zero-dispersion wavelength of the optical amplifying fibers 11 and 12 is fixed, it is possible to adjust the Bragg wavelength of the FBG included in the relative phase shifter 13 and the oscillation wavelength of the semiconductor laser device so as to match the zero-dispersion wavelength, by using the mechanisms described above.

In this situation, it is possible to adjust the temperature of the FBG by arranging the FBG to be positioned over a Peltier device or a heater serving as the temperature adjusting mechanism, while a heat sink made of copper, aluminum, ceramic, or the like is interposed therebetween, so that the FBG is fixed so as to be thermally in contact with the Peltier device or the heater. Further, it is possible to adjust the temperature more precisely by providing a temperature sensor such as a thermistor on the heat sink and adjusting the temperature while monitoring the temperature.

Next, an optical amplifier according to a first example was manufactured by applying the temperature adjusting mechanism 14 to the optical amplifier 100 according to the first embodiment, and the characteristics thereof were measured by using the measuring system illustrated in FIG. 1. The zero-dispersion wavelength of the optical amplifying fibers 11 and 12 were 1562.6 nm when the ambient temperature was at a room temperature of 25° C., but the optical amplifying fibers 11 and 12 were heated by the temperature adjusting mechanism 14 up to 126.5° C. so as to adjust the zero-dispersion wavelength to 1565.6 nm. The dispersion slope at the wavelength 1550 nm was 0.04 ps/nm$^2$/km. The transmission loss at the wavelength 1550 nm was 1.2 dB/km. The non-linear constant at the wavelength 1550 nm was 21.4/W/km. Further, the lengths of the optical amplifying fibers 11 and 12 were 100 m and 130 m, respectively. The fluctuation of the zero-dispersion wavelength in the longitudinal direction of the optical amplifying fibers 11 and 12 was within the limit of 0.5 nm/100 m. It was possible to fused-connect the optical amplifying fibers 11 and 12 with a communication-purpose standard single-mode optical fiber compliant with ITU-T G.652 with a connection loss of 0.1 dB or smaller.

Further, the power of the pump light input to the optical amplifying member 10 was approximately 31.76 dBm, while the pump light wavelength was 1565.6 nm. The transmission wavelength bandwidth of the optical band-pass filter 24 in the pump light source unit 20 was 0.8 nm. The power of the signal light input to the optical amplifying member 10 was approximately −20 dBm. While the relative phase shifter 13 was configured with an FBG, the Bragg wavelength was 1565.9 nm, which was longer by 0.3 nm than the temperature-adjusted zero-dispersion wavelength of the optical amplifying fibers 11 and 12. Further, the width of the reflection bandwidth curve of the FBG was 0.65 nm, while the transmission loss for the Bragg wavelength was −39 dB. In that situation, the deviation of the phase of the pump light was thought to be approximately 0.35π±0.15π.

Figure 6:
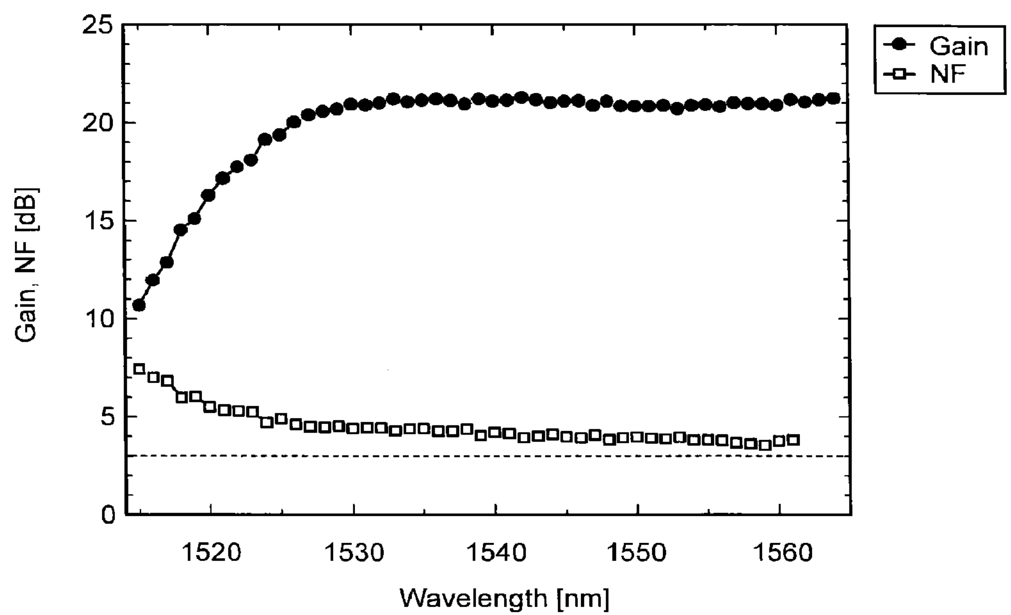
FIG. 6 is a chart illustrating dependency of a gain and a Noise Figure (NF) on the wavelength, with respect to an optical amplifier according to a manufactured first example.

FIG. 6 is a chart illustrating dependency of the gain and the NF on the wavelength, with respect to the optical amplifier according to the manufactured first example. The horizontal axis expresses the wavelength of the input signal light. In the present description, the gains and the NF characteristics are indicated with values obtained by eliminating the effect of the optical loss of the optical multiplexer/demultiplexer, and the like, i.e., the net values of the optical amplifying member. As illustrated in FIG. 6, the optical amplifier according to the manufactured first example exhibited amplification characteristics where the gain was 20.7 dB, the 1-dB gain bandwidth was 38 nm, which was able to cover the C band, and the NF in the 1-dB gain bandwidth was 4.5 dB or smaller. In other words, by using the optical amplifier according to the manufactured first example, it was possible to realize an extremely high degree of flatness in the gain spectrum, a broadband characteristic that was able to cover the C band, and a high gain of 20 dB or higher, as well as an extremely small NF. Further, compared to an example (described later) using an optical amplifying fiber having a large fluctuation in the zero dispersion in the longitudinal direction, it was possible to realize an amplification characteristic where a higher gain was achieved, while realizing the gain spectrum that was flat and had the broadband characteristic.

Figure 7:
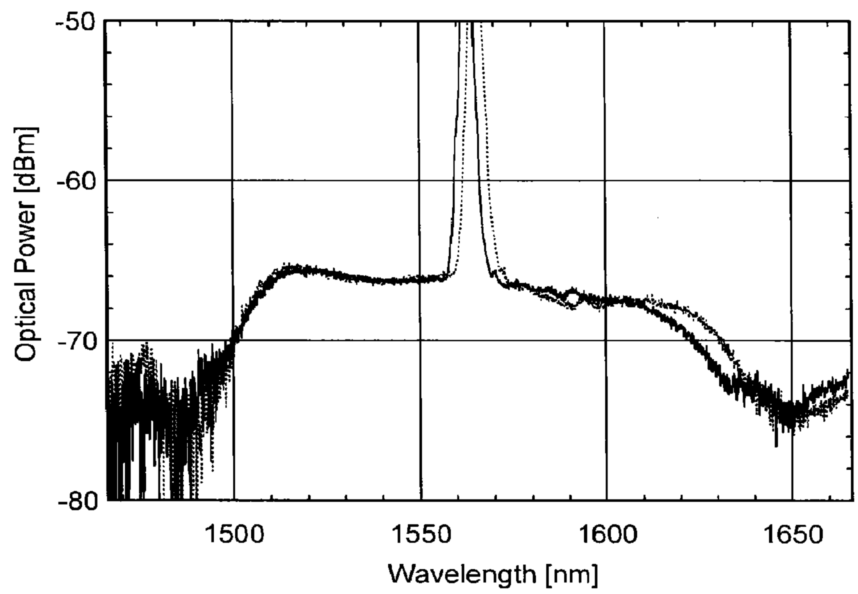
FIG. 7 is a chart illustrating an Amplified Spontaneous Emission (ASE) spectrum obtained when the pump light wavelength and the temperatures of the optical amplifying fibers were adjusted, with respect to the optical amplifier according to the manufactured first example.

FIG. 7 is a chart illustrating an ASE spectrum obtained when the pump light wavelength and the temperatures of the optical amplifying fibers 11 and 12 were adjusted, with respect to the optical amplifier according to the manufactured first example. In this situation, no signal light was input. The solid line indicates the example in which the temperatures of the optical amplifying fibers 11 and 12 were arranged to be a room temperature, while the pump light wavelength was set to 1562.6 nm (i.e., the zero-dispersion wavelength at a room temperature). The broken line indicates the example in which the temperatures of the optical amplifying fibers 11 and 12 were arranged to be 128.7° C., while the pump light wavelength was set to 1565.0 nm, which was longer by 2.4 nm than that at the room temperature.

The broadband spectrum around the peak indicating the pump light indicates the ASE spectrum of the optical amplifier. For an optical amplifier configured with an OPA, the shape of the ASE spectrum substantially corresponds to the shape of the gain spectrum. In this situation, the fact that the ASE spectrum is shaped in such a manner that the power becomes lower toward the longer wavelength side reflects a characteristic where the optical attenuation amount (approximately −20 dB) of the optical attenuator 200 in the measuring system increases toward the longer wavelength side.

As illustrated in FIG. 7, the ASE spectrum in the solid line substantially overlaps the ASE spectrum in the broken line. This signifies that, when the pump light wavelength is changed from the state where the zero-dispersion wavelength matches the pump light wavelength at the room temperature, it is possible to obtain an ASE spectrum (or a gain spectrum) having the same shape as an ASE spectrum (or a gain spectrum) in the state where the zero-dispersion wavelength matches the pump light wavelength at the room temperature, by adjusting the temperatures of the optical amplifying fibers 11 and 12 according to the change in the pump light wavelength and shifting the zero-dispersion wavelength so as to be close to the pump light wavelength. By using the technique by which the temperatures of the optical amplifying fibers 11 and 12 are adjusted, it is possible to easily bring the pump light wavelength and the zero-dispersion wavelength close to each other within the range of ±0.5 nm.

Figure 8:
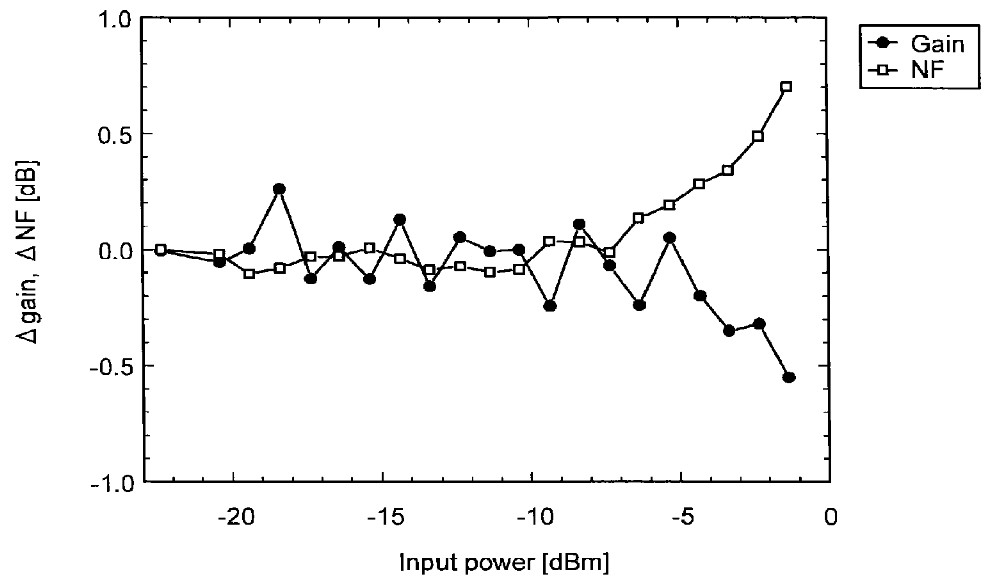
FIG. 8 is a chart illustrating dependency of the gain and the NF on the power of input signal light, with respect to the optical amplifier according to the manufactured first example.

FIG. 8 is a chart illustrating dependency of the gain and the NF on the power of the input signal light, with respect to the optical amplifier according to the manufactured first example. The vertical axis expresses differences in the gain and the NF observed when the power of the input signal light was −20 dBm. As illustrated in FIG. 8, both the gain and the NF were substantially constant when the power of the input signal light was −10 dBm or lower, but a decrease in the gain and an increase in the NF were observed when the power of the input signal light was −10 dBm or higher.

Figure 9:
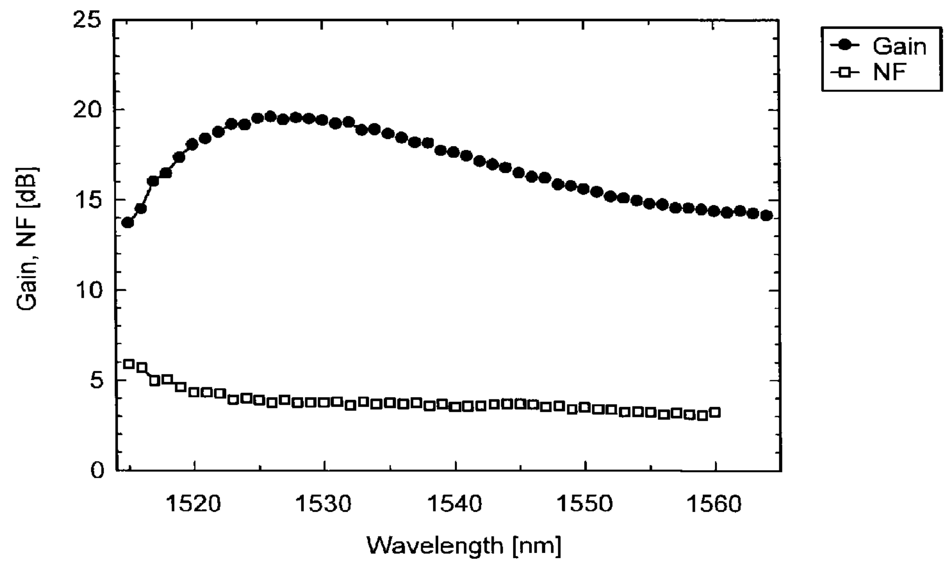
FIG. 9 is a chart illustrating dependency of a gain and an NF on the wavelength observed when a relative phase shifter was eliminated from the configuration of the optical amplifier according to the manufactured first example.

FIG. 9 is a chart illustrating dependency of the gain and the NF on the wavelength observed when the relative phase shifter was eliminated from the configuration of the optical amplifier according to the manufactured first example, so that the optical amplifying fibers 11 and 12 were directly fused and connected together. As illustrated in FIG. 9, when no relative phase shifter was provided, although the degree of flatness in the gain became lower than when the relative phase shifter was provided as illustrated in FIG. 6, the NF was improved.

Figure 25:
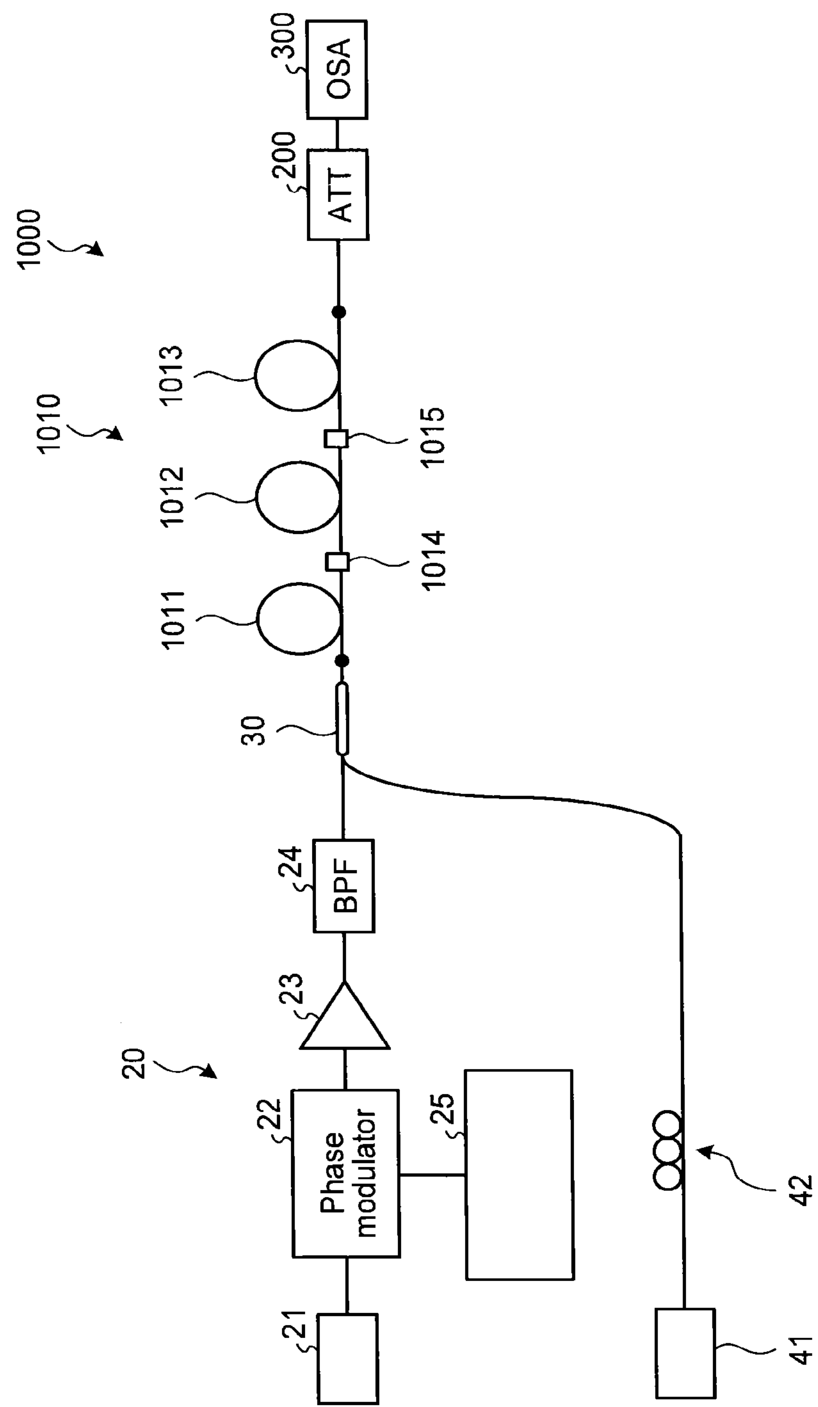
FIG. 25 is a schematic diagram of an already-disclosed optical amplifier and an amplification characteristic measuring system thereof.

Next, for a comparison purpose, characteristics of an optical amplifier disclosed in S. Takasaka et al., "FOPA with Flat 21-dB Gain and NF less than 4-dB using Alternately Concatenated Pump-Phase Shifters and HNLFs", OFC/NFOEC 2013, JTh2A.13 (2013) by the inventors of the present invention will be explained. FIG. 25 is a schematic diagram of the already-disclosed optical amplifier and an amplification characteristic measuring system thereof. An optical amplifier 1000 is obtained by replacing the optical amplifying member 10 included in the optical amplifier 100 according to the first embodiment illustrated in FIG. 1 with an optical amplifying member 1010. The optical amplifying member 1010 is a three-stage optical amplifying member that includes optical amplifying fibers 1011, 1012, and 1013, as well as relative phase shifters 1014 and 1015 that are inserted between the optical amplifying fibers 1011 and 1012 and the optical amplifying fibers 1012 and 1013.

The zero-dispersion wavelength of the optical amplifying fibers 1011, 1012, and 1013 was 1567.0 nm at a room temperature. The dispersion slope at the wavelength 1550 nm was 0.017 ps/nm$^2$/km. The transmission loss at the wavelength 1550 nm was 0.8 dB/km. The non-linear constant at the wavelength 1550 nm was 12/W/km. Further, the lengths of the optical amplifying fibers 1011, 1012, and 1013 were 120 m, 150 m, and 200 m, respectively. The fluctuation of the zero-dispersion wavelength in the longitudinal direction of the optical amplifying fibers 1011, 1012, and 1013 was larger than 0.5 nm/100 m.

Further, the power of the pump light input to the optical amplifying member 1010 was approximately 32.2 dBm, while the pump light wavelength was 1567.2 nm. The transmission wavelength bandwidth of the optical band-pass filter 24 in the pump light source unit 20 was 0.8 nm. The power of the signal light input to the optical amplifying member 1010 was approximately −20 dBm. The relative phase shifters 1014 and 1015 were each configured with an all-pass dielectric multilayer film filter. The insertion losses of the relative phase shifters 1014 and 1015 were 1.0 dB and 1.2 dB, respectively, at the wavelength 1550 nm. The insertions losses were approximately the same values for the wavelengths of the pump light and the signal light.

Figure 26:
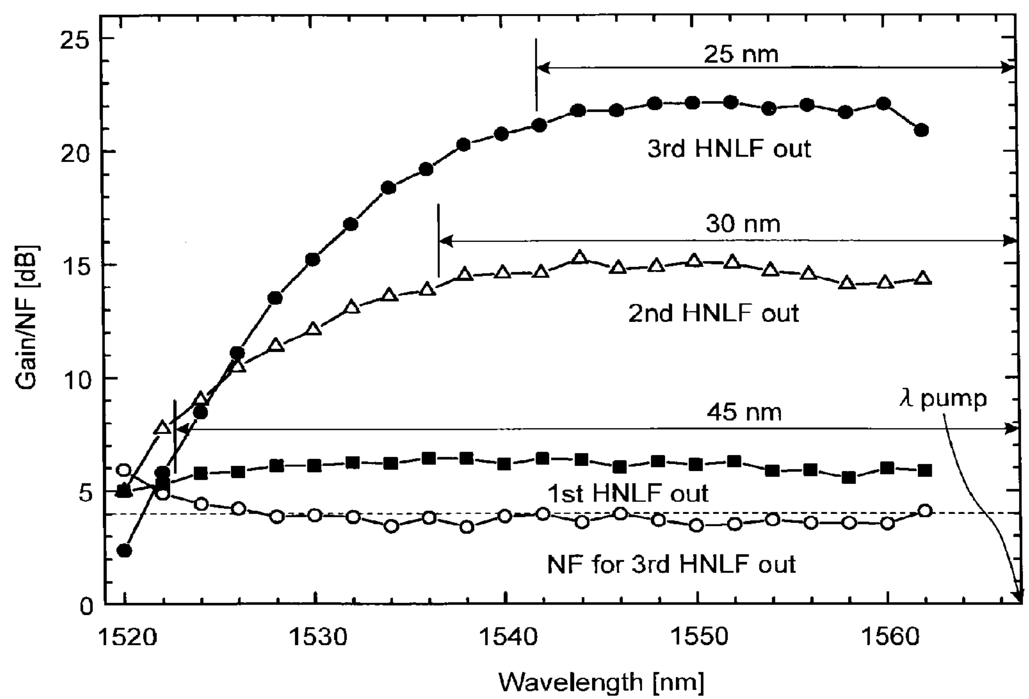
FIG. 26 is a chart illustrating dependency of a gain and an NF on the wavelength, with respect to the optical amplifier illustrated in FIG. 25.

FIG. 26 is a chart illustrating dependency of the gain and the NF on the wavelength, with respect to the optical amplifier illustrated in FIG. 25. The horizontal axis expresses the wavelength of the input signal light. Further, "1st Highly Non-Linear Fiber (HNLF) out", "2nd HNLF out", and "3rd HNLF out" indicate characteristics observed on the output side of the optical amplifying fibers 1011, 1012, and 1013, respectively.

As illustrated in FIG. 26, by adopting the three-stage configuration, the optical amplifier 1000 realizes the gain of 21 dB, which exceeds the practical level of gain, 20 dB. However, the 1-dB gain bandwidth was 25 nm and was not sufficient to cover the C band.

As explained above, according to the first embodiment of the present invention, it is possible to realize the optical amplifier capable of achieving the higher gain, while realizing the gain spectrum that is flat and has the broadband characteristic.

<Modification Examples>

Figure 10:
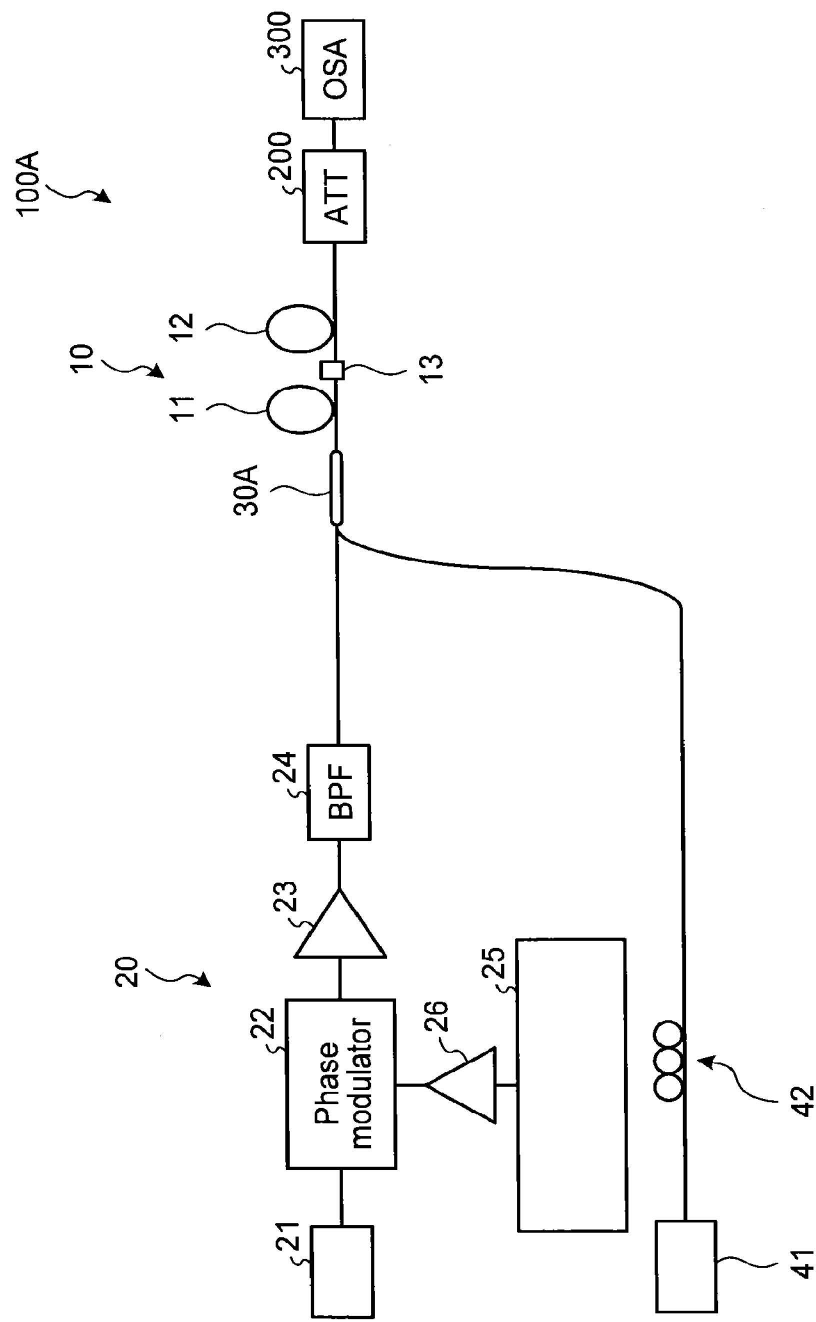
FIG. 10 is a schematic diagram illustrating an optical amplifier according to a modification example of the first embodiment and an amplification characteristic measuring system thereof.

FIG. 10 is a schematic diagram illustrating an optical amplifier 100A according to a modification example of the first embodiment of the present invention and an amplification characteristic measuring system thereof. As illustrated in FIG. 10, the optical amplifier 100A according to the present modification example is obtained by replacing the optical multiplexer/demultiplexer 30 included in the optical amplifier 100 according to the first embodiment, with an optical multiplexer/demultiplexer 30A.

The optical multiplexer/demultiplexer 30A is configured with an optical band-pass filter having three ports. The optical band-pass filter has a characteristic where the pump light is passed, whereas light having a wavelength other than the wavelength of the pump light is reflected. In this situation, the optical band-pass filter may be replaced with a C/L band optical coupler. The C/L band optical coupler is an optical coupler having the function of multiplexing together light beams in the two bands of the C band and the L band (e.g., 1565 nm to 1620 nm), by using a low-pass filter or a high-pass filter. When the C/L band optical coupler is used, the pump light is input to the optical multiplexer/demultiplexer 30A from the L-band-specific port side. By using the optical multiplexer/demultiplexer 30A, it is possible to reduce the optical loss of the pump light when the pump light is multiplexed with the signal light, compared to the example in which the optical multiplexer/demultiplexer 30 configured with a 20-dB optical coupler is used. It is therefore possible to arrange pump light having a power higher by 0.5 dB, for example, to be input to the optical amplifying member 10.

Next, an optical amplifier according to a second example was manufactured by applying the temperature adjusting mechanism 14 to the optical amplifier 100A according to the present modification example, and the characteristics thereof were measured by using the measuring system illustrated in FIG. 10. The optical amplifier according to the second example has the same configuration as that of the optical amplifier according to the first example, except that the optical multiplexer/demultiplexer 30A is configured with a three-port optical band-pass filter and that the power of the pump light input to the optical amplifying member 10 is higher by 0.5 dB. The measuring process was performed under the same measuring condition. It should be noted, however, that the temperatures of the optical amplifying fibers 11 and 12 were adjusted with a higher level of precision.

Figure 11:
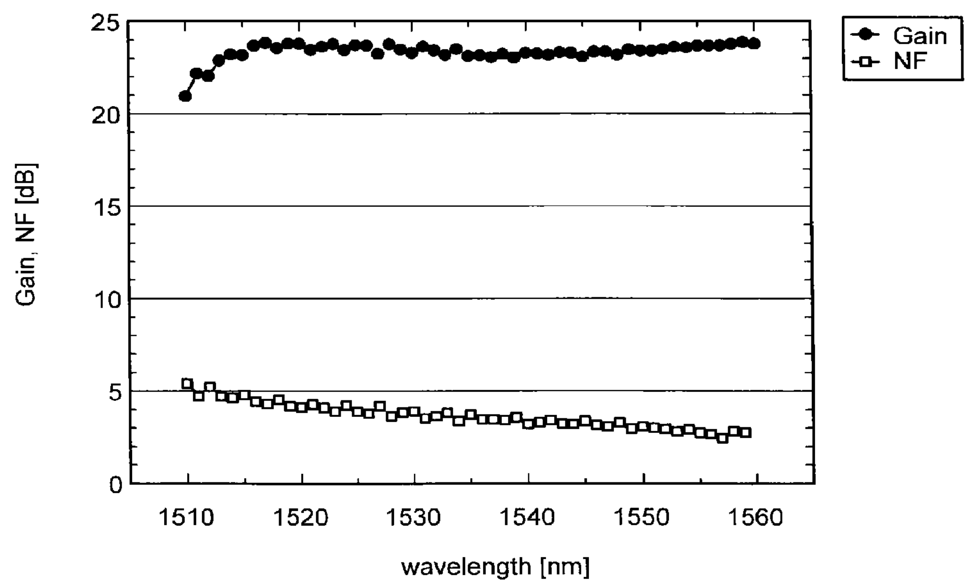
FIG. 11 is a chart illustrating dependency of a gain and an NF on the wavelength, with respect to an optical amplifier according to a manufactured second example.

FIG. 11 is a chart illustrating dependency of the gain and the NF on the wavelength, with respect to the optical amplifier according to the manufactured second example. The horizontal axis expresses the wavelength of the input signal light. As illustrated in FIG. 11, the optical amplifier according to the manufactured second example exhibited amplification characteristics where the gain was 23 dB, the 1-dB gain bandwidth was 50 nm (1515 nm to 1565 nm), which was extremely large and was able to sufficiently cover the C band, and the NF in the 1-dB gain bandwidth was 4.5 dB or smaller. In other words, by using the optical amplifier according to the manufactured second example, it was possible to realize an extremely high degree of flatness in the gain spectrum, an extremely broad broadband characteristic that was able to sufficiently cover the C band, and a high gain of 20 dB or higher, as well as an extremely small NF.

With the optical amplifier according to the manufactured second example, when the zero-dispersion wavelength of the optical amplifying fibers 11 and 12 was shifted by 0.1 nm to 0.2 nm from the pump light wavelength toward the shorter wavelength side by adjusting the temperatures thereof, characteristics as described below were observed.

Figure 12:
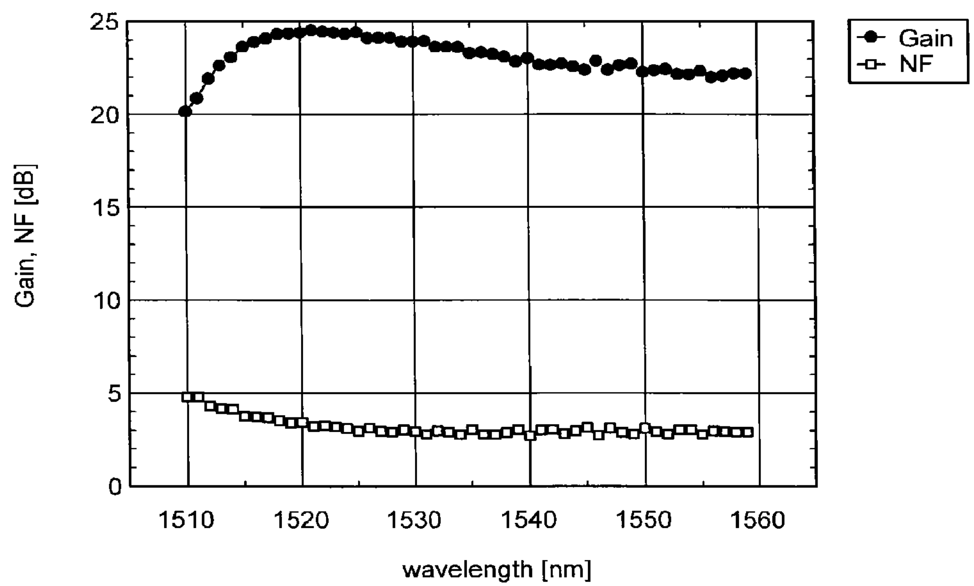
FIG. 12 is a chart illustrating dependency of a gain and an NF on the wavelength observed when a zero-dispersion wavelength was adjusted, with respect to the optical amplifier according to the manufactured second example.

FIG. 12 is a chart illustrating dependency of the gain and the NF on the wavelength observed when the zero-dispersion wavelength was adjusted, with respect to the optical amplifier according to the manufactured second example. As illustrated in FIG. 12, when the zero-dispersion wavelength was adjusted, although the degree of flatness of the gain was lower compared to the example illustrated in FIG. 11, the NF was extremely improved so as to be approximately 3 dB in a large range from 1525 nm to 1560 nm.

As explained above, the inventors of the present invention discovered that, by appropriately shifting the zero-dispersion wavelength of the optical amplifying fibers 11 and 12 from the pump light wavelength toward the shorter wavelength side, it is possible to achieve an NF that was extremely improved, although the degree of flatness of the gain was lowered. It should be noted that, with respect to the optical amplifier in the state illustrated in FIG. 12, although the degree of flatness of the gain was lowered, the gain of 20 dB or higher was realized in the extremely large bandwidth from 1510 nm to 1560 nm. Accordingly, by installing, on the output side of the optical amplifier in the state illustrated in FIG. 12, a gain flattening optical filter which has a transmission wavelength characteristic that is an inversion of the gain wavelength characteristic illustrated in FIG. 12 (e.g., a wavelength characteristic where the transmissivity is lower at wavelengths having high gains) and which flattens the gain wavelength characteristic after the output, it is possible to realize an optical amplifier that has an extremely small NF, while realizing a gain of 20 dB or higher in an extremely large bandwidth.

Although the reason why such an extremely small NF was realized is not clear, it is considered that the region having a high gain observed at the wavelength 1520 nm in FIG. 12 is due to a gain caused by modulation instability that occurred because the pump light wavelength is in an anomalous dispersion region of the optical amplifying fibers 11 and 12. Accordingly, with the optical amplifier in the state illustrated in FIG. 12, by appropriately shifting the zero-dispersion wavelength of the optical amplifying fibers 11 and 12 from the pump light wavelength toward the shorter wavelength side, it is assumed that it was possible to realize the extremely small NF while appropriately suppressing the decreasing amount of the decrease in the degree of flatness of the gain because the MI to an appropriate degree was exhibited, although the degree of flatness of the gain was decreased by the gain from the MI, which is dependent on the wavelength.

<Second Embodiment>

Figure 13:
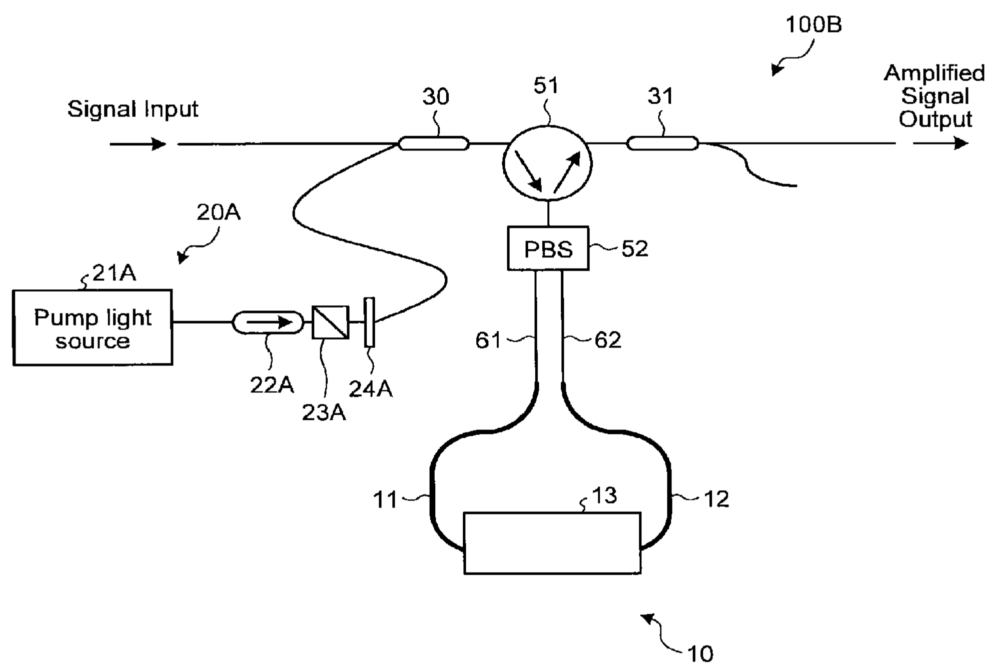
FIG. 13 is a schematic diagram of an optical amplifier according to a second embodiment.

FIG. 13 is a schematic diagram of an optical amplifier according to a second embodiment of the present invention. As illustrated in FIG. 13, an optical amplifier 100B according to the second embodiment, which is an OPA, includes the optical amplifying member 10, a pump light source unit 20A, the optical multiplexer/demultiplexer 30, an optical multiplexer/demultiplexer 31, an optical circulator 51, a polarization multiplexer/demultiplexer 52, and connection polarization-maintaining optical fibers 61 and 62.

The pump light source unit 20A includes a pump light source 21A, an optical isolator 22A, a polarizer 23A, and a waveplate 24A. The pump light source 21A has the same configuration as that of the pump light source unit 20 illustrated in FIG. 1, for example, and outputs pump light having a predetermined pump light wavelength to the optical isolator 22A. The optical isolator 22A passes the pump light toward the polarizer 23A side and also blocks any return light that is propagated from the polarizer 23A side so as not to enter the pump light source 21A. The polarizer 23A arranges the pump light that passed through the optical isolator 22A to be linearly-polarized light. The waveplate 24A may be a ½ waveplate, a ¼ waveplate, or the like and is configured to rotate the polarization direction of the pump light that was arranged to be the linearly-polarized light. It is possible to adjust the rotation angle of the polarization direction for the pump light realized by the waveplate 24A, by adjusting the angle of the waveplate 24A.

The optical multiplexer/demultiplexer 30 has the function of multiplexing the pump light input thereto from the pump light source unit 20A with signal light input thereto from an external source and outputting the result to the optical circulator 51. For example, although the optical multiplexer/demultiplexer 30 may be a 20-dB optical coupler or a C/L band optical coupler, there is no particular limitation. For example, like the optical multiplexer/demultiplexer 30A, the optical multiplexer/demultiplexer 30 may be a three-port optical band-pass filter.

The optical circulator 51 receives the inputs of the pump light and the signal light from the optical multiplexer/demultiplexer 30 and passes the pump light and the signal light to the polarization multiplexer/demultiplexer 52. The polarization multiplexer/demultiplexer 52 performs a polarization separating process on the signal light and the pump light to obtain polarization components that are in a polarized state of being orthogonal to each other and outputs each of the polarization components to a different one of the connection polarization-maintaining optical fibers 61 and 62.

The connection polarization-maintaining optical fibers 61 and 62 are connected to the two ends of the optical amplifying member 10. In other words, the connection polarization-maintaining optical fiber 61 is connected to the optical amplifying fiber 11 side of the optical amplifying member 10, whereas the connection polarization-maintaining optical fiber 62 is connected to the optical amplifying fiber 12 side of the optical amplifying member 10.

The polarization components obtained from the angles of the signal light and the pump light as a result of the polarization separating process performed by the polarization multiplexer/demultiplexer 52 are input to the optical amplifying member 10 from the optical amplifying fiber 11 side and from the optical amplifying fiber 12 side, so as to be propagated through the optical amplifying fibers 11 and 12 in the opposite directions with respect to each other. The optical amplifying fibers 11 and 12 parametrically amplify the signal light being propagated. The polarization components that are amplified while being propagated in the opposite directions with respect to each other are each output from the optical amplifying fiber of the optical amplifying member 10 positioned on the side opposite from the input side, and are further propagated through the connection polarization-maintaining optical fibers 61 and 62. The polarization multiplexer/demultiplexer 52 receives inputs of the polarization components that have been propagated through the connection polarization-maintaining optical fibers 61 and 62, performs a polarization combining process thereon, and outputs the result to the optical circulator 51.

The optical circulator 51 outputs the signal light resulting from the polarization combining and amplifying process and the pump light resulting from the polarization combining process both of which were input thereto, to the optical multiplexer/demultiplexer 31. Although the optical multiplexer/demultiplexer 31 may be, for example, a 20-dB optical coupler or a C/L band optical coupler, there is no particular limitation. For example, like the optical multiplexer/demultiplexer 30A, the optical multiplexer/demultiplexer 31 may be a three-port optical band-pass filter. The optical multiplexer/demultiplexer 31 demultiplexes the amplified signal light and the pump light that have been input thereto from the optical circulator 51 and outputs the results from mutually-different ports. For example, the optical multiplexer/demultiplexer 31 outputs the amplified signal light from the port indicated with a straight line in the drawing and outputs the pump light from the port indicated with a curved line in the drawing.

In this situation, because the pump light is usually light having a high power such as 1 W or higher, the pump light is disposed by a publicly-known optical disposer after being output from the port. The optical disposer has a function of, for example, absorbing light, converting the energy thereof into heat, and radiating the heat resulting from the conversion.

Similarly to the configuration in the first embodiment, the optical amplifier 100B according to the second embodiment includes the optical amplifying fibers 11 and 12 of which the fluctuation of the zero-dispersion wavelength in the longitudinal direction is small. Further, the optical amplifier 100B is configured to perform the polarization separating process on the pump light and the signal light input thereto, to input the polarization components that are orthogonal to each other to the optical amplifying fibers 11 and 12 so as to be propagated through the optical amplifying fibers 11 and 12 in the opposite directions with respect to each other, and to perform the polarization combining process on the polarization components that are orthogonal to each other and are amplified by being propagated through the optical amplifying fibers 11 and 12 in the opposite directions with respect to each other. With these arrangements, the optical amplifier 100B exhibits the advantageous effects achieved in the first embodiment and also functions as what is called a polarization-independent optical amplifier that is able to provide a gain that has low dependency on polarization, even if the input signal light is in an arbitrary polarized state. In this situation, it is desirable to arrange the polarization direction of the input pump light to be such a polarization direction that makes the dependency of the optical amplifier 100B on the polarization low or preferably minimum, by adjusting the angle of the waveplate 24A. Further, it is desirable to configure the optical amplifying member 10 so as to be centrosymmetric. For example, when the optical amplifying fibers 11 and 12 have the same characteristics as each other, it is desirable to arrange the optical amplifying fibers 11 and 12 to have the same length as each other and to arrange the relative phase shifter 13 to be positioned at the center of the optical amplifying member 10 in the longitudinal direction.

Figure 14:
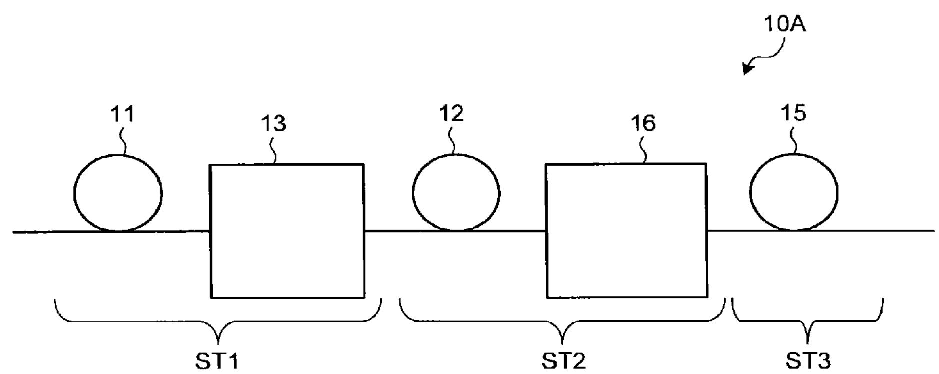
FIG. 14 is a schematic diagram of a three-stage optical amplifying unit.

Each of the optical amplifiers according to the first and the second embodiments and the modification examples described above includes the two-stage optical amplifying member 10 in which the single relative phase shifter 13 is inserted between the optical amplifying fibers 11 and 12. However, the optical amplifying member does not necessarily have to have the two-stage configuration, and may have a one-stage configuration or a three-or-more-stage configuration. For example, as illustrated in FIG. 14, an optical amplifying member 10A may be used as the optical amplifying member in which relative phase shifters 13 and 16 are inserted between the optical amplifying fibers 11 and 12 and between the optical amplifying fibers 12 and 15. The optical amplifying member 10A configured in this manner is a three-stage optical amplifying member including amplifying stages ST1, ST2, and ST3. In this situation, the optical amplifying fiber 15 may have the same configuration as those of the optical amplifying fibers 11 and 12. The relative phase shifter 16 may have the same configuration as that of the relative phase shifter 13. Similarly to the example of the two-stage configuration, it is desirable to configure and arrange the optical amplifying member having three or more stages that is applied to the configuration in the second embodiment so as to realize centrosymmetricity in the longitudinal direction, with respect to the amplification characteristics and the lengths of the optical amplifying fibers, the phase shift amounts of the relative phase shifters, and the like. For example, when the amplifying medium has a three-stage configuration, i.e., when three optical amplifying fibers and used, while two relative phase shifters having mutually-the-same phase shift amount are connected between the three optical amplifying fibers, it is desirable to arrange the optical amplifying fibers positioned on the two ends to have mutually-the-same length and to arrange the optical amplifying fiber positioned at the center to be longer, on the assumption that the optical amplifying fibers have the same characteristics as one another. With these arrangements, regardless of the directions in which the polarization components are propagated, it is possible to compensate the decrease in the gain caused by the insertion loss of the relative phase shifters, by arranging the optical amplifying fiber positioned at the center to be longer.

Further, the relative phase shifters each do not necessarily have to employ an FBG, but may each be an all-pass-filter-type relative phase shifter configured by using a dielectric multilayer film filter and a reflective module. The all-pass-filter-type relative phase shifter is able to adjust the phase shift amount by adjusting the pump light wavelength. Further, the all-pass-filter-type relative phase shifter is desirable because there is no reflection of a specific wavelength.

Further, when the relative phase shifter is provided in the form of a module, it is desirable to use an optical fiber having any of the following characteristics as a pigtail fiber therein: an optical fiber of which the zero-dispersion wavelength is in the range satisfying "the used pump light wavelength±10 nm"; an optical fiber of which the dispersion slope is 0.06 ps/nm$^2$/km or smaller; or an optical fiber having both of these characteristics. The reason is to avoid the situation where the relative phase is changed by the wavelength dispersion of the pigtail fiber and where the phase matching state is destructed. Further, when the pigtail fiber is fused and connected to an optical amplifying fiber, it is desirable to arrange the mode field diameter (MFD) of the pigtail fiber to match the MFD of the optical amplifying fiber within the range of ±50%. The reason is that, by arranging the MFDs to match within such a range, it is possible to arrange the fused connection loss between the pigtail fiber and the optical amplifying fiber to be 0.5 dB or smaller.

Incidentally, when wavelength-multiplexed (Wavelength Division Multiplex [WDM]) signal light is input to an OPA, unnecessary Four Wave Mixing (FWM) light is generated due to a non-linear optical effect of the optical amplifying fiber. Further, signal light beams contained in the WDM signal light are deteriorated by a crosstalk between the FWM light and the signal light, and the NF thus becomes larger.

In Robert Elschner et al., "Characterization of FWM-Induced Crosstalk for WDM Operation of a Fiber-Optical Parametric Amplifier", ECOC 2011 Mo.1.A.2, ASE light was used as signal light in place of the WDM signal light, so as to find out NF characteristics of an OPA brought about by FWM light. As a result, it is reported that it was possible to prevent the NF from increasing when the difference between the power of the pump light and the power of the amplified ASE light was 20 dB or larger.

In view of this finding, the inventors of the present invention further discovered through careful examinations that, when the power difference between the power of pump light and a total power of WDM signal light that are input to an optical amplifier in an OPA is 24 dB or larger, the deterioration amount of the WDM signal light is sufficient for practical use.

Figure 15:
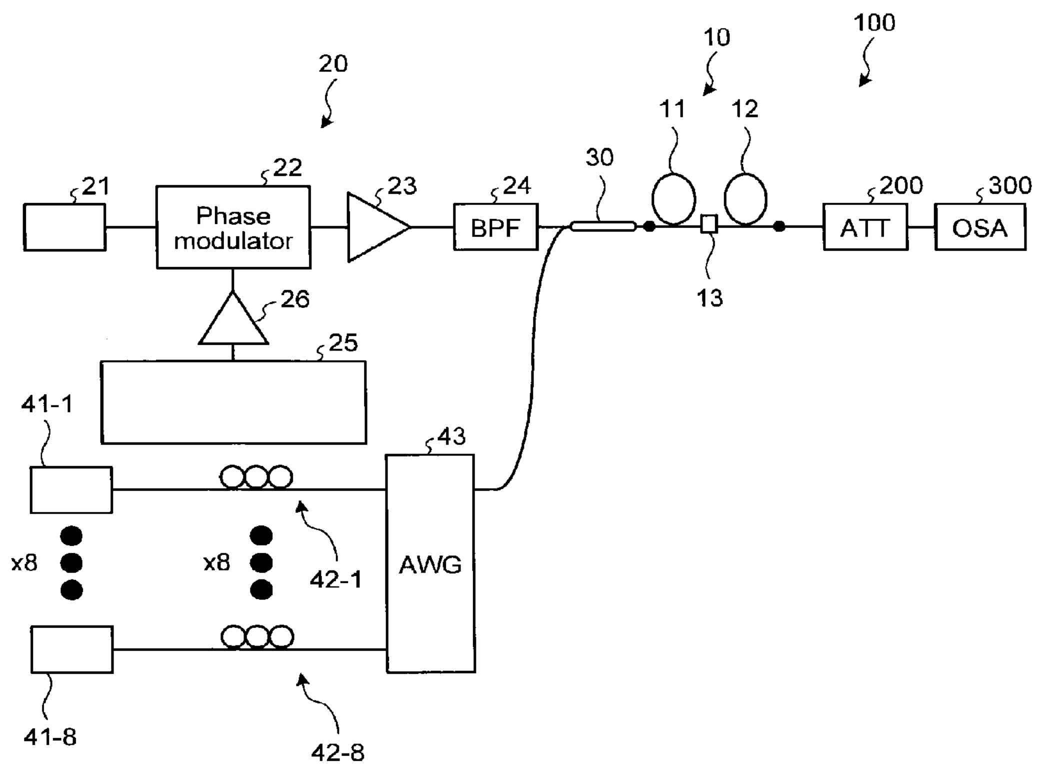
FIG. 15 is a schematic diagram of the optical amplifier according to the first embodiment and a Wavelength Division Multiplex (WDM) amplification characteristic measuring system thereof.

Next, the notion above will be explained more specifically by using results of a WDM amplification characteristic experiment. FIG. 15 is a schematic diagram of the optical amplifier according to the first embodiment and a WDM amplification characteristic measuring system thereof. In this situation, to realize WDM signal light sources, polarization controllers 42-1 to 42-8 were respectively connected to eight signal light sources 41-1 to 41-8, so that signal light beams that were output from the signal light sources 41-1 to 41-8 and had mutually-different wavelengths (at approximately 1.2-nm intervals in the range from 1550 nm to 1560 nm) were multiplexed by an Arrayed Waveguide Grating (AWG) 43 and so that eight-channel WDM signal light was generated and input to the optical amplifier 100 according to the first embodiment. Further, as the optical amplifier 100 according to the first embodiment, the optical amplifier according to the manufactured first example was used. Further, the pump light wavelength of the pump light was arranged to be apart, by 5 nm or more, from the wavelength of the eight-channel WDM signal light.

Figure 16:
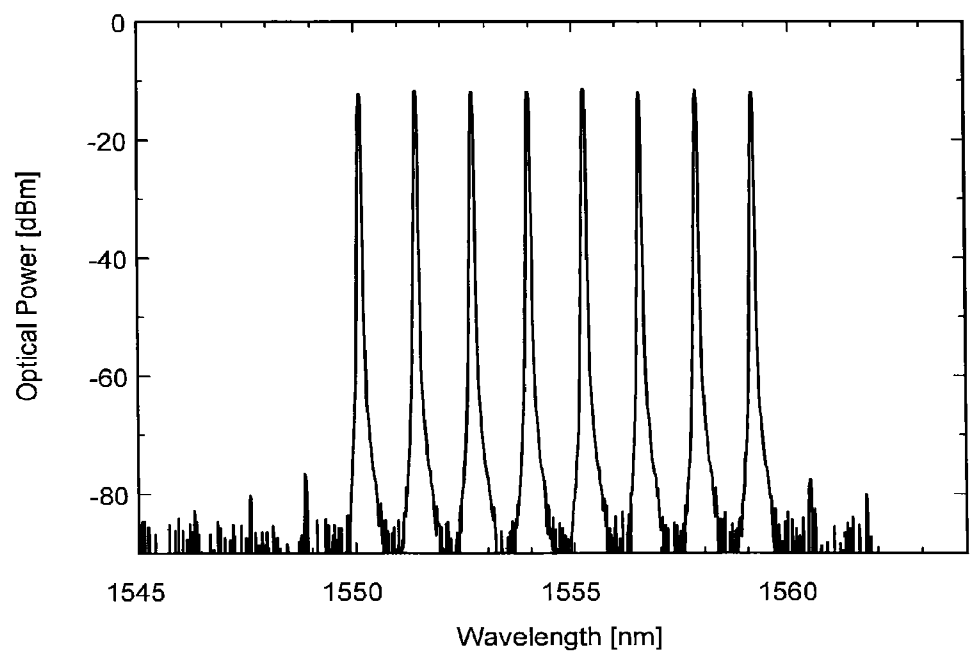
FIG. 16 is a chart illustrating a spectrum of eight-channel WDM signal light that was input.
Figure 17:
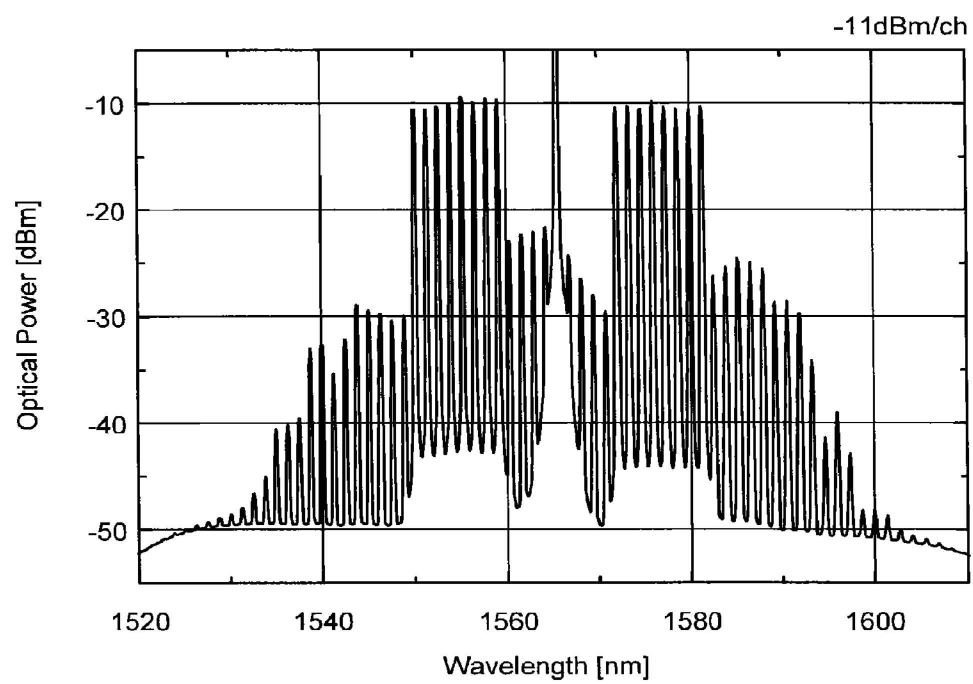
FIG. 17 is a chart illustrating a spectrum of an example of amplified eight-channel WDM signal light.
Figure 18:
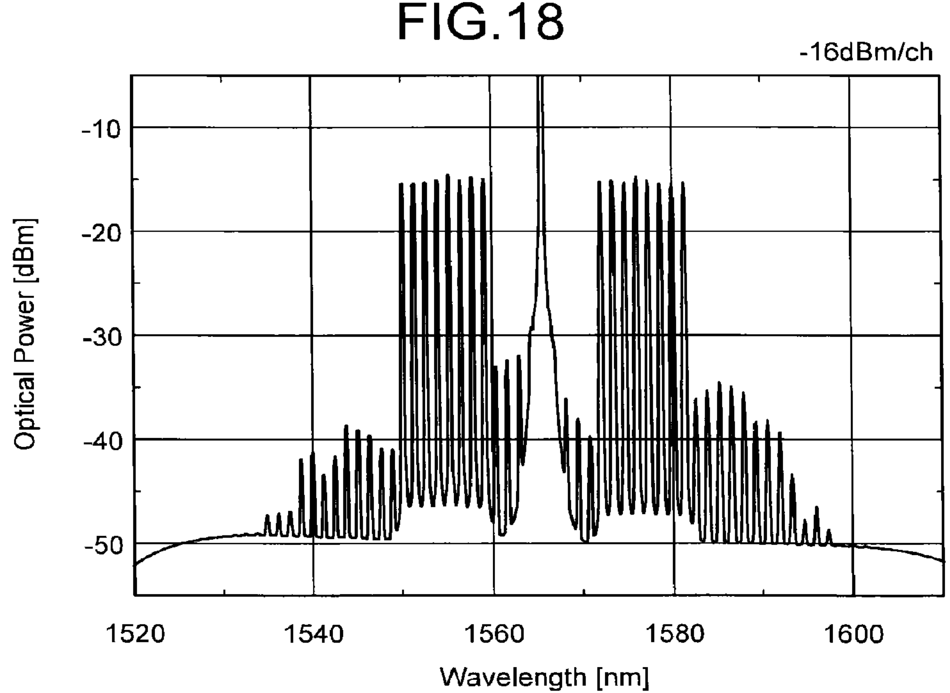
FIG. 18 is a chart illustrating a spectrum of another example of amplified eight-channel WDM signal light.
Figure 19:
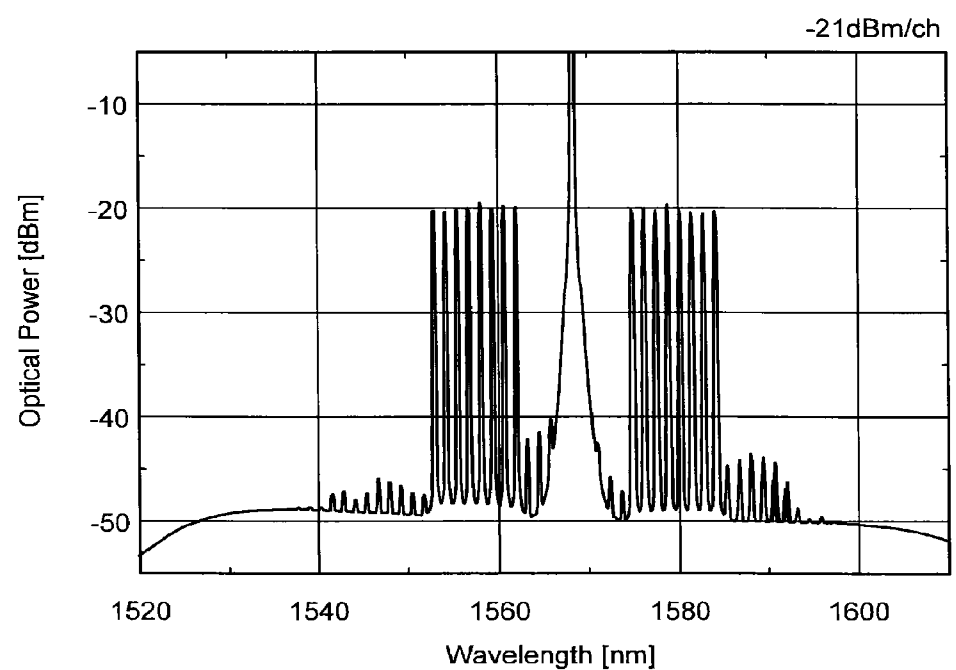
FIG. 19 is a chart illustrating a spectrum of yet another example of amplified eight-channel WDM signal light.
Figure 20:
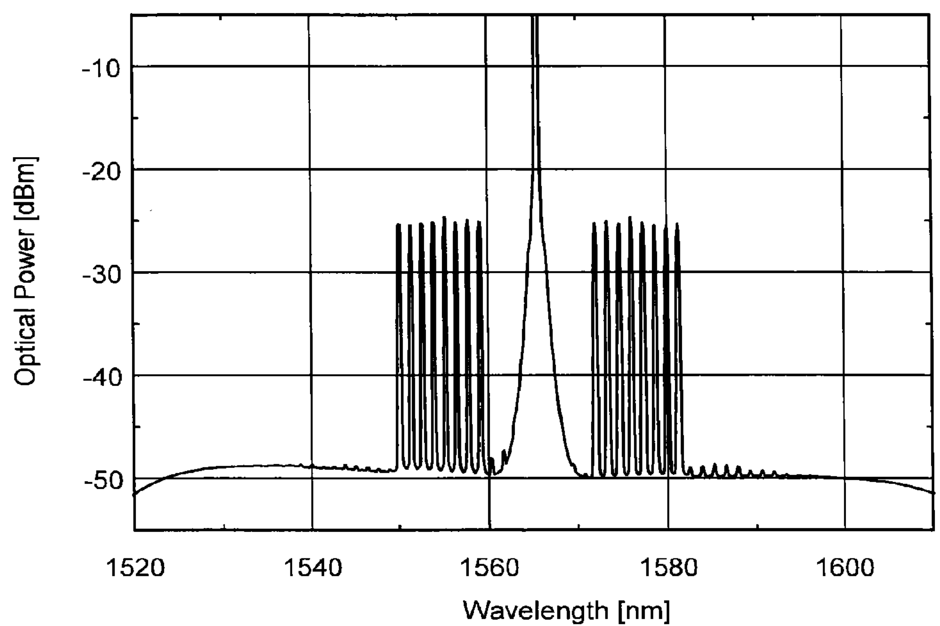
FIG. 20 is a chart illustrating a spectrum of yet another example of amplified eight-channel WDM signal light.
Figure 21:
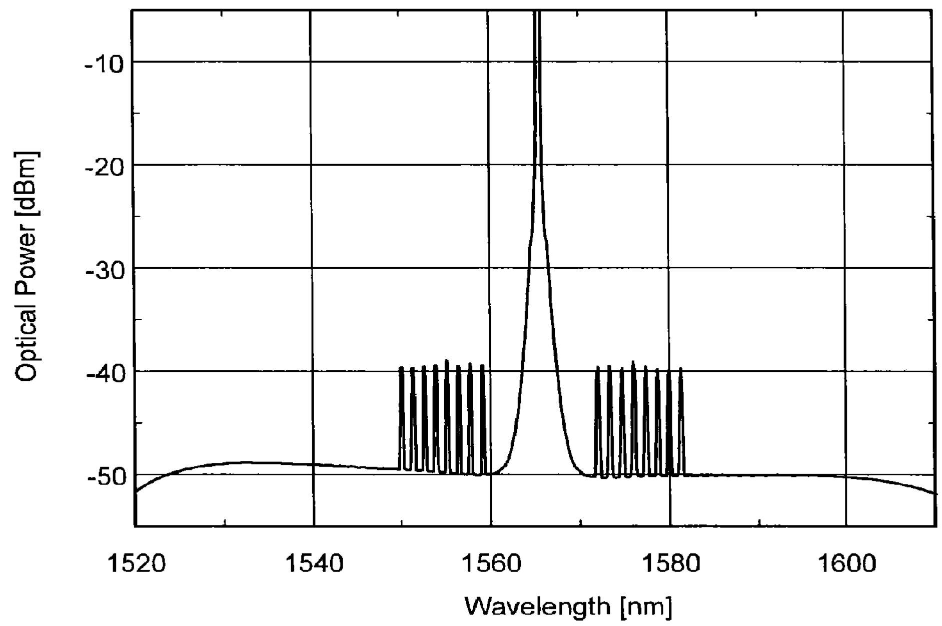
FIG. 21 is a chart illustrating a spectrum of yet another example of amplified eight-channel WDM signal light.
Figure 22:
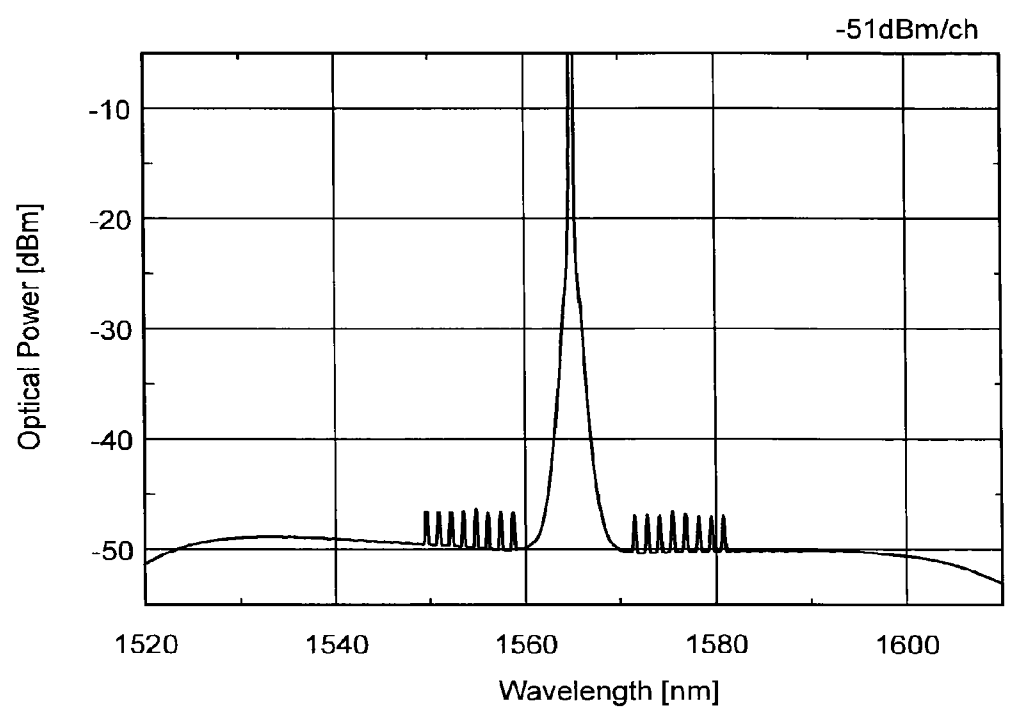
FIG. 22 is a chart illustrating a spectrum of yet another example of amplified eight-channel WDM signal light.

FIG. 16 is a chart illustrating a spectrum of the eight-channel WDM signal light that was input. The polarization controllers 42-1 to 42-8 were each adjusted so as to maximize the gain of each of the signal light beams in the optical amplifier. The other conditions were the same as those used in the experiment of which the result was illustrated in FIG. 6. In this situation, the power of the input pump light was 32.2 dBm.

FIGS. 17 to 22 are charts illustrating the spectrum of the amplified eight-channel WDM signal light in various examples. FIGS. 17 to 22 illustrate the examples in which the optical power per channel of the WDM signal light input to the optical amplifier was −11 dBm/ch, −16 dBm/ch, −21 dBm/ch, −26 dBm/ch, −41 dBm/ch, and −51 dBm/ch, respectively. The attenuation amount of the optical attenuator 200 was either −19 dB (in the examples of −11 dBm/ch and −16 dBm/ch) or −20 dB (in the other examples). Accordingly, the actual optical power output from the optical amplifier was a value obtained by adding either 19 dB or 20 dB to the value on the vertical axis in each of the charts.

As illustrated in FIGS. 17 to 22, the higher the power of the eight-channel WDM signal light was, the higher was the power of the generated FWM light. In particular, in the examples higher than −21 dBm/ch, the deterioration of the eight-channel WDM signal light caused by the FWM light was significant. However, in the example of −21 dBm/ch, which is the level expected in practical use, the power difference between the eight-channel WDM signal light and the FWM light was 20 dB or larger, and the generation amount of the FWM light was at an acceptable level in an optical amplifier in practical use. Further, when the power of the eight channel WDM signal light was lower than −21 dBm/ch, the generation amount of the FWM light became significantly lower and lower.

In this situation, the total power of the eight-channel WDM signal light input to the optical amplifier was (−21+20+9) dBm=8 dBm. In contrast, the pump light power was 32.2 dBm. Accordingly, the power difference between the power of the pump light and the total power of the wavelength-multiplexed signal light was (32.2 dBm−8 dBm)=24.2 dB. When the power difference between the power of the pump light and the total power of the WDM signal light that were input to the optical amplifier was 24 dB or larger as described herein, the degradation amount of the WDM signal light was sufficient for practical use.

Figure 23:
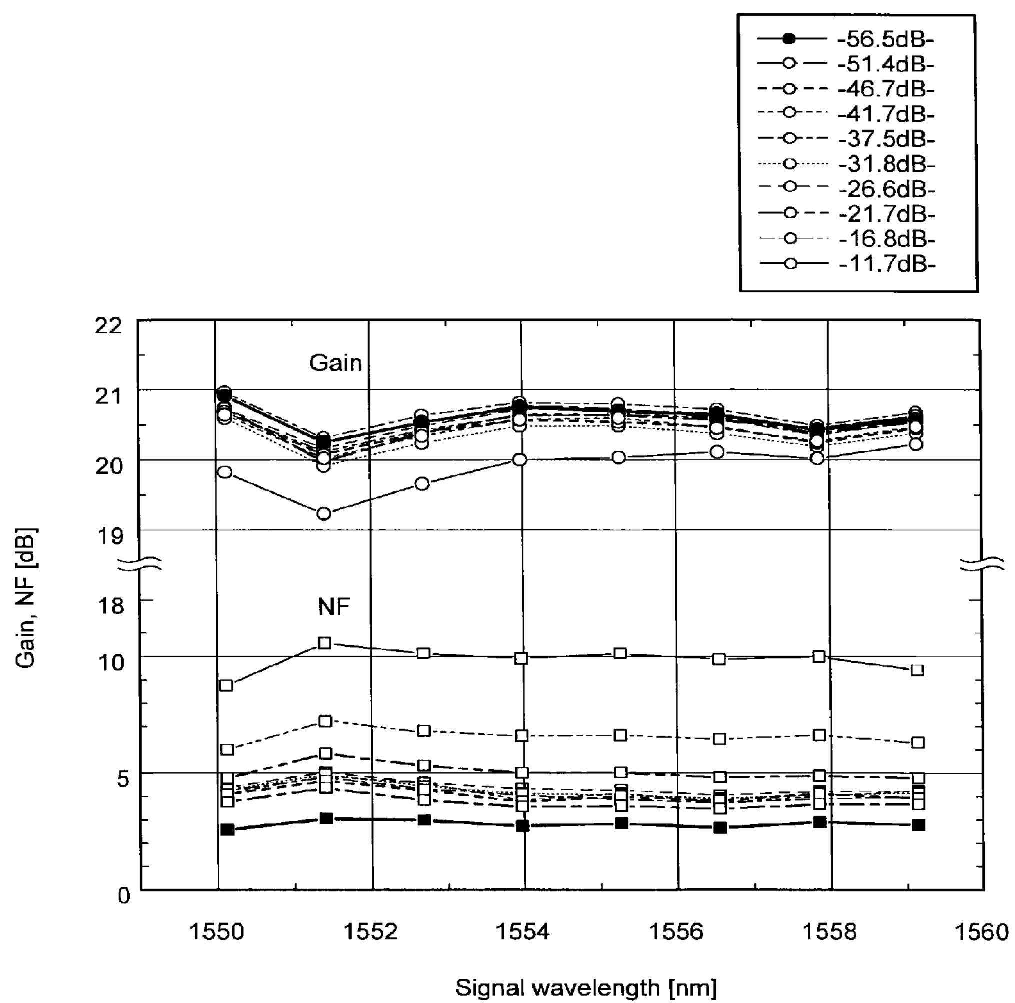
FIG. 23 is a chart illustrating dependency of a gain and an NF on the wavelength observed when eight-channel WDM signal light was input to the optical amplifier according to the first example.

Next, FIG. 23 is a chart illustrating dependency of the gain and the NF on the wavelength observed when eight-channel WDM signal light was input to the optical amplifier according to the first example. The power of the signal light per channel was varied from −56 dBm/ch to −11 dBm/ch. As illustrated in FIG. 23, the optical amplifier according to the first example was able to achieve a sufficient gain even when the eight-channel WDM signal light was input thereto. As for the NF, because the wavelength intervals between the signal light beams of the eight-channel WDM signal light was small, the noise floor was measured to be larger than the actual value. Thus, the measured NF is considered to be larger than the actual NF value. For this reason, a similar WDM amplification characteristic experiment was carried out by using four-channel WDM signal light (at approximately 2.4-nm intervals in the range from 1550 nm to 1560 nm), in place of the eight-channel WDM signal light.

Figure 24:
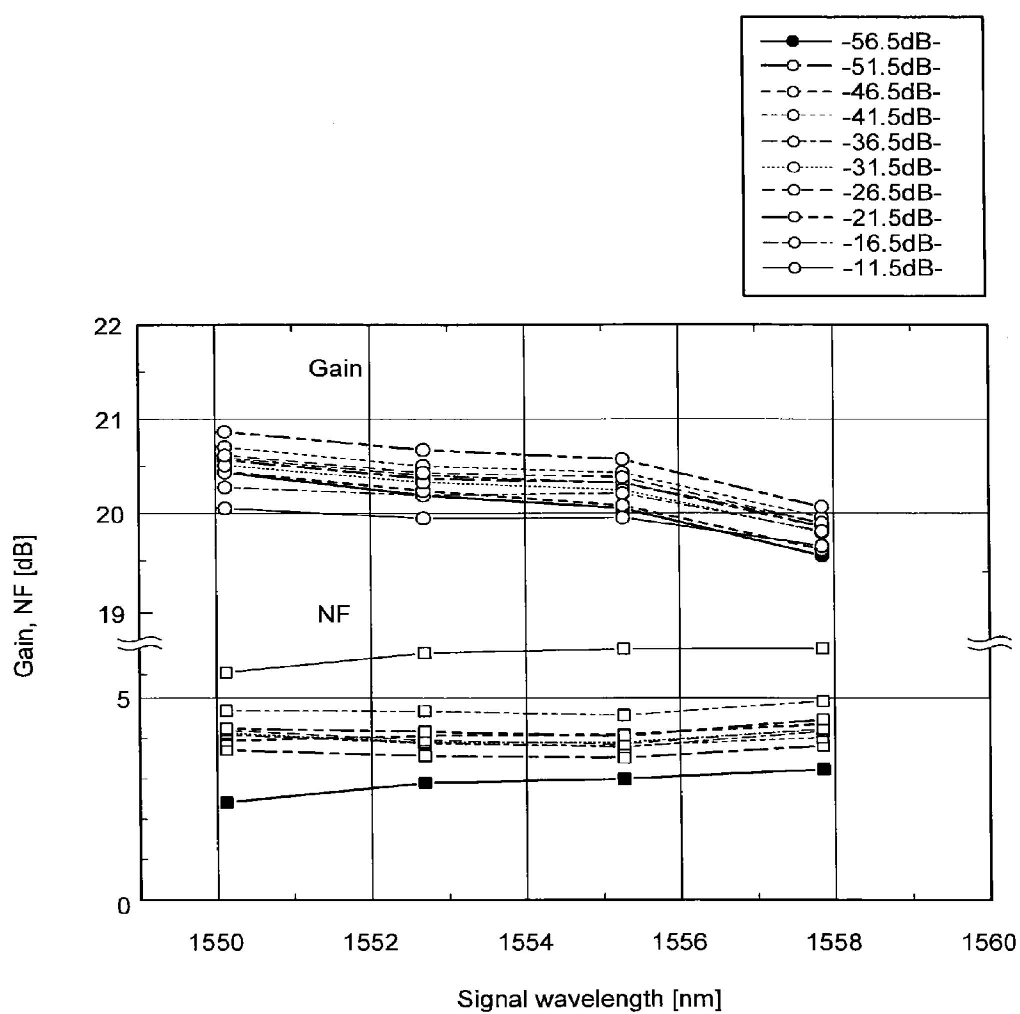
FIG. 24 is a chart illustrating dependency of a gain and an NF on the wavelength observed when four-channel WDM signal light was input to the optical amplifier according to the first example.

FIG. 24 is a chart illustrating dependency of the gain and the NF on the wavelength observed when the four-channel WDM signal light was input to the optical amplifier according to the first example. The power of the signal light per channel was varied from −56 dBm/ch to −11 dBm/ch. As illustrated in FIG. 24, as for the NF, in the example of −21 dBm/ch, which is the level expected in practical use, an NF smaller than 4.5 dB was achieved. Further, when the power of the signal light was higher than −21 dBm/ch, because the noise floor was measured to be larger than the actual value, the measured NF is considered to be larger than the actual NF value.

In this situation, similarly to the examples disclosed in International Publication No. WO 2012/121223 and International Application No. PCT/JP2012/072255, it is also acceptable to configure an optical amplifying system by installing the optical amplifier according to any of the embodiments described above at a stage preceding an EDFA or at a stage following an optical amplifying system utilizing a Raman effect. The optical amplifying system configured in this manner is an optical amplifying system that has low noise and a high output in the system as a whole, due to the low-noise characteristics of the optical amplifier according to the embodiments.

Further, similarly to the examples disclosed in International Publication No. WO 2012/121223 and International Application No. PCT/JP2012/072255, it is also possible to construct an optical communication system that utilizes the optical amplifier according to any of the embodiments described above. It is thereby possible to make the transmission distance longer and to make the electric power consumption lower by reducing the transmission power, for an optical communication system that employs a conventional EDFA as an optical amplifier.

Further, similarly to the examples disclosed in International Publication No. WO 2012/121223 and International Application No. PCT/JP2012/072255, it is also possible to use the optical amplifier according to any of the embodiments described above, as a wavelength converter or a PSA.

The present invention is not limited to the embodiments described above. Configurations obtained by combining together any of the constituent elements described above as appropriate are also included in the scope of the present invention. Further, a person skilled in the art will be able to easily derive other advantageous effects and modification examples. Accordingly, broader modes of the present invention are not limited by the embodiments described above, and it is possible to make various changes.

As explained above, the optical amplifier, the optical amplifying system, the wavelength converter, and the optical communication system according to the present invention are suitable for use primarily in the field of optical communications.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical amplifier comprising:

a plurality of optical amplifying fibers;

a relative phase shifter that is inserted between two or more of the optical amplifying fibers and that changes a relative phase of light input; and a pump light source that supplies phase-modulated pump light to the optical amplifying fibers, the pump light being used for parametrically amplifying signal light input to the optical amplifying fibers by using a nonlinear optical effect of the optical amplifying fibers, wherein a fluctuation of a zero-dispersion wavelength of the optical amplifying fibers in a longitudinal direction is within a limit of 0.5 nm/100 m, the each of optical amplifying fibers has a core portion including:

a center core part;

an outer core layer which is formed in a surrounding of the center core part and of which a refractive index is lower than that of the center core part; and at least one buffer core layer which is formed between the center core part and the outer core layer and of which a refractive index is lower than that of the center core part and is higher than that of the outer core layer, and a cladding portion which is formed in a surrounding of the outer core layer and of which a refractive index is lower than that of the center core part and is higher than that of the outer core layer, and an effective core area at a wavelength of 1550 nm is 18 μm2 or smaller, the optical amplifying fibers are configured so that the effective core area at the wavelength 1550 nm is in a range from 10.27 μm2 to 18 μm2 inclusive, a relative refractive-index difference of the center core part to the cladding portion is in a range from 1.8% to 3.0% inclusive, a relative refractive-index difference of the outer core layer to the cladding portion is in a range from −1.2% to −0.2% inclusive, a relative refractive-index difference of the buffer core layer to the cladding portion is in a range from 0.1% to 0.6% inclusive, an outside diameter of the outer core layer is in a range from 9.4 μm to 21.4 μm inclusive, a ratio of a diameter of the center core part to the outside diameter of the outer core layer is in a range from 0.20 to 0.40 inclusive, a ratio of an outside diameter of the buffer core layer to the outside diameter of the outer core layer is in a range from 0.24 to 0.80 inclusive, and in a range where an absolute value of a wavelength dispersion at the wavelength 1550 nm is 5 ps/nm/km or smaller, a fluctuation of the wavelength dispersion at the wavelength 1550 nm caused by a 1% change in the outside diameter of the outer core layer is 0.7 ps/nm/km or smaller.

2. The optical amplifier according to claim 1, comprising one selected from between:

a temperature adjusting mechanism that adjusts a temperature of the optical amplifying fibers; and a tension adjusting mechanism that adjusts a tension applied to the optical amplifying fibers.

3. The optical amplifier according to claim 1, comprising one selected from between: a temperature adjusting mechanism that adjusts a temperature of a semiconductor laser device included in the pump light source; and a driving current adjusting mechanism that adjusts a driving current for the semiconductor laser device.

4. The optical amplifier according to claim 1, further comprising: a relative phase shifter that is inserted between two or more of the optical amplifying fibers and that changes a relative phase of light input thereto, wherein the phase shifter is a fiber Bragg grating, and the optical amplifier comprises one selected from between: a temperature adjusting mechanism that adjusts a temperature of the fiber Bragg grating; and a tension adjusting mechanism that adjusts a tension applied to the fiber Bragg grating.

5. The optical amplifier according to claim 2, wherein the zero-dispersion wavelength of the optical amplifying fibers at an ambient temperature is on a shorter wavelength side, by 5 nm or less, of a first zero-dispersion wavelength at which a flat gain bandwidth of the optical amplifier is at a maximum when a wavelength of the pump light is set to a predetermined pump light wavelength, and the temperature adjusting mechanism adjusts the temperature of the optical amplifying fibers in such a manner that the zero-dispersion wavelength of the optical amplifying fibers becomes close to the first zero-dispersion wavelength.

6. The optical amplifier according to claim 1, wherein the zero-dispersion wavelength of the optical amplifying fibers is shorter than the pump wavelength, and the optical amplifier comprises: a gain flattening filter that flattens a gain wavelength characteristic of the optical amplifier.

7. The optical amplifier according to claim 1, comprising:

polarization multiplexer/demultiplexer that receives an input of the signal light and the pump light, performs a polarization separating process on the signal light and the pump light to obtain polarization components that are in a polarized state of being orthogonal to each other, inputs the polarization components orthogonal to each other to the optical amplifying fibers so as to be propagated through the optical amplifying fibers in opposite directions with respect to each other, and performs a polarization combining process on the polarization components orthogonal to each other that have been amplified by being propagated through the optical amplifying fibers in the opposite directions with respect to each other.

8. The optical amplifier according to claim 1, wherein a power difference between a power of the pump light and a total power of the signal light that are input to the optical amplifier is 24 dB or larger.

9. An optical amplifying system comprising: the optical amplifier according to claim 1.

10. A wavelength converter comprising: the optical amplifier according to claim 1.

11. An optical communication system comprising: the optical amplifier according to claim 1.

12. The optical amplifier according to claim 8, wherein a pump light wavelength of the pump light is set so as to be apart, by 5 nm or more, from a wavelength of wavelength-multiplexed signal light.

13. An optical amplifying system comprising: the optical amplifier according to claim 1.

14. A wavelength converter comprising: the optical amplifier according to claim 1.

15. An optical communication system comprising: the optical amplifier according to claim 1.

* * * * *